US012639612B2

(12) United States Patent
Akino et al.

(10) Patent No.: US 12,639,612 B2
(45) Date of Patent: May 26, 2026

(54) INTEGRATED SENSING AND COMMUNICATIONS EMPOWERED BY NETWORKED HYBRID QUANTUM-CLASSICAL MACHINE LEARNING

(71) Applicant: Mitsubishi Electric Research Laboratories, Inc., Cambridge, MA (US)

(72) Inventors: Toshiaki Koike Akino, Belmont, MA (US); Ye Wang, Andover, MA (US); Pu Wang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 727 days.

(21) Appl. No.: 18/152,425

(22) Filed: Jan. 10, 2023

(65) Prior Publication Data

US 2023/0368065 A1 Nov. 16, 2023

Related U.S. Application Data

(60) Provisional application No. 63/364,428, filed on May 10, 2022.

(51) Int. Cl.
*G06N 10/60* (2022.01)

(52) U.S. Cl.
CPC .................................... *G06N 10/60* (2022.01)

(58) Field of Classification Search
CPC ........ G06N 10/00; G06N 10/20; G06N 10/60; G06N 10/80; G06N 10/40; G06N 10/70
See application file for complete search history.

(56) References Cited

U.S. PATENT DOCUMENTS

2019/0205790 A1* 7/2019 Dukatz .................. G06N 10/60
2020/0169396 A1 5/2020 Neven et al.
(Continued)

OTHER PUBLICATIONS

Koike-Akino et al., "Variational Quantum Demodulation for Coherent Optical Multi-Dimensional QAM", May 4, 2020, 2020 Optical Fiber Communications Conference and Exhibition (OFC), pp. 1-3. (Year: 2020).*

(Continued)

*Primary Examiner* — Paulinho E Smith
(74) *Attorney, Agent, or Firm* — Gene Vinokur

(57) ABSTRACT

Communication-capable devices such as commercial Wi-Fi devices can be used for integrated sensing and communications (ISAC) systems to jointly exchange data and monitor environment. Such devices typically require diverse signal processing such as machine learning inference that demands high-power operations for real-time sensing and computing. The present invention provides a way to realize energy-efficient computing by exploiting the capability of data communications to access distributed computing resources including classical computers and quantum computers over networks. The system and method are based on the realization that computationally intensive processing is offloaded to networked hybrid classical-quantum computing to build dynamic computing graphs. Some embodiments use automated classical-quantum machine learning whose circuits and hyperparameters are automatically adjusted via gradient or heuristic optimization for Wi-Fi indoor monitoring and human tracking.

20 Claims, 20 Drawing Sheets

(56)                    References Cited

U.S. PATENT DOCUMENTS

2021/0182721  A1      6/2021  Li et al.
2022/0036231  A1*     2/2022  Wang ...................... G06N 3/02

OTHER PUBLICATIONS

Bergholm et al., "PennyLane: Automatic Differentiation of Hybrid
Quantum-Classical Computations", Feb. 14, 2020, arXiv.com, pp.
1-15 (Year: 2020).*
Karalekas et al., "A Quantum-Classical Cloud Platform Optimized
for Variational Hybrid Algorithms", May 31, 2020, arXiv.com,
1-21. (Year: 2020).*
Heimann et al., "Quantum Deep Reinforcement Learning for Robot
Navigation Tasks", Feb. 24, 2022, arXiv.com, pp. 1-8 (Year: 2022).*

* cited by examiner (a) Angle Embed        (b) IQP Embed        (c) Simple 2-Design (d) QAOA        (e) Tree Tensor Net        (f) Matrix Prod State (g) Strong Entangle        (h) Basic Entangle        (i) Random

INTEGRATED SENSING AND COMMUNICATIONS EMPOWERED BY NETWORKED HYBRID QUANTUM-CLASSICAL MACHINE LEARNING

FIELD OF THE INVENTION

The present invention is related to a machine learning and inference system for sensing via signals for data communications, and more particularly to a hybrid quantum-classical machine learning system for wireless sensor networks, Wi-Fi indoor monitoring, body-area sensor networks, THz spectroscopy, coherent optical sensing, mmWave localization, driving navigations, and object tracking.

BACKGROUND & PRIOR ART

Communications devices such as cellular phones, Wi-Fi access points, and internet-of-thing (IoT) appliances have become pervasive almost everywhere in normal life environment. The communications devices were primarily used to exchange data from one point to another point by modulating signals such as electro-magnetic wave through wired or wireless medium channels. To exchange data securely and reliably, various signal processing methods are carried out such as error control coding, data compression, pulse shaping, channel estimation, and so on.

Over the past decade, the communications devices with a sensing capability have received tremendous attention as a new technical framework called integrated sensing and communications (ISAC). Because the data communications depend on channel links which vary according to an environmental change such as ambient object motion, the communications devices are inherently able to sense the environmental state by estimating channels during data communications without relying on other external sensors. For example, Wi-Fi sensing or wireless local-area-network (WLAN) sensing uses Wi-Fi access points or Wi-Fi mobile equipment to realize indoor monitoring in addition to data communications. Some work groups have been focusing on WLAN sensing by making greater use of 802.11 standard technologies towards new industrial and commercial applications. Some WLAN sensing frameworks use either channel state information (CSI) from the physical (PHY) layer or received signal strength indicator (RSSI) measurements from the medium access control (MAC) layer. The RSSI measurement suffers from the measurement instability and coarse granularity of the channel information, leading to limited accuracy for sensing. The CSI measurement has higher granularity for sensing, while it requires access to PHY-layer interfaces and high computational power to process a large amount of sub-carrier data.

As one of WLAN sensing applications, a technical field of indoor localization provides a way to identify the location of an object in an enclosed area. The object can be a device that transmits and/or receives signals to/from some other devices, or an entity without such a capability. A number of indoor localization industry applications require precise indoor localization, such as locating objects in hospitals, warehouses, shopping malls, factories, to name a few. Some conventional indoor localization approaches require the installation of dedicated hardware in an indoor area. However, these types of conventional approaches are undesirable due to the requirement of expensive dedicated hardware into the indoor localization system. An example of this approach is ultra-wide band (UWB) radio localization systems which are expensive and are used as a last resort option for the community. Other examples include systems based on light detection and ranging (LIDAR), radar or ultrasound, requiring high installation and maintenance cost likewise UWB localization systems. Hence, ISAC capable of accurate sensing without the need of external sensors is a viable solution for various applications.

However, the dependency and correlation between the channel state and a target sensing factor are often weak and it is hard to accurately estimate the sensing value from the communications signals. To resolve the issue, machine learning and deep learning methods based on deep neural networks (DNN) have been used for ISAC. For example, WLAN sensing first gather massive data during communications, and the data are uses as a fingerprinting database for training DNN models to predict the sensing factors in an online manner. DNN can be used for image classification, speech recognition, computational sensing, compressed sensing, data analysis, feature extraction, signal processing, and artificial intelligence. There are many DNN architectures such as multi-layer perceptron, recurrent network, convolutional network, transformer network, attention network, long short-term memory, generative adversarial network, auto-encoder, U-shaped network, residual network, reversible network, loopy network, clique network, implicit layers, and a variant thereof. Although a high performance of a DNN has been demonstrated in many practical systems, it has still been a challenge to train and deploy a DNN at a resource-limited hardware with a small memory and processing power for real-time applications. This is partly because the typical DNN has a large number of trainable parameters such as weights and biases, with many artificial neurons across deep hidden layers which also require a large number of arithmetic multiplication and floating-point operations. In addition, they need massive training data and training iterations, leading to high power requirements in general.

Besides standard DNNs, an emerging framework of quantum neural networks (QNNs) which leverage a quantum processing unit (QPU) was introduced as an alternative computing paradigm for a future era of quantum supremacy. QNNs can solve some issues of classical DNN approaches because of exponentially large parallel computations with fewer parameters. Quantum computers have the potential to realize computationally efficient signal processing compared to traditional digital computers by exploiting quantum mechanism, e.g., superposition and entanglement, in terms of not only execution time but also energy consumption. Nevertheless, quantum processors require careful maintenance and thus it is difficult to embed into mobile devices.

The quantum machine learning (QML) is considered as a potential driver in the sixth generation (6G) applications. In the past few years, several companies including IBM, Google, and Honeywell have manufactured commercial quantum computers. For instance, IBM has released 433-qubit QPUs available to the public via a cloud service in 2022, and plans to produce 1121-qubit QPUs by 2023. Some groups reported to have achieved quantum supremacy for specific problems, while the quantum advantage is not thoroughly validated for general problems. It is no longer far future when noisy intermediate-scale quantum (NISQ) computers will be widely used for various real applications. Although quantum-ready algorithms for wireless communications systems have been investigated, most existing works assume fault-tolerant QPUs, which are beyond the capability of near-term NISQ devices.

Besides machine learning inference, the communications devices require diverse signal processing methods that demand high-power operations for real-time sensing and computing. Therefore, there is a need to develop ISAC systems and methods enabling low-cost, low-power and reduced-hardware deployment.

SUMMARY OF THE INVENTION

Our invention is based on a recognition that communications devices are capable of accessing external computing resources without implementing them on premise and that hybrid use of quantum computing processors and classical computing processors provide high-performance, low-power, and flexible signal processing. The present invention is based on networked use of both classical deep neural network (DNN) and quantum neural network (QNN) at a good loading balance by distributing the operation resources over network, where sensing facilities have data access point which is inherently easy to communicate with remote servers to carry out any heterogenous computing graph across DNNs and QNNs. QNNs include quanvolution, quantum graph neural network (QGNN), tensor network, quantum autoencoder, quantum generative adversarial network, quantum reservoir network, quantum implicit layers, and so on.

Accordingly, our invention is based on a recognition that integrated sensing and communications (ISAC) have a capability to access remote quantum computing servers such as Amazon braket and IBM quantum. Our invention uses a hybrid classical-quantum machine learning to exploit this capability for sensing and data analysis so that the ISAC systems are deployed with a low-cost and low-power overhead. In some embodiments, several Wi-Fi access points will monitor indoor/outdoor environment and ambient users during communications, channel acquisition, and beam tracking. The Wi-Fi access points employ hybrid use of DNNs and QNNs on cloud or on premise when available.

In some embodiments, THz time-domain spectroscopy systems, biosignal sensing systems, and LIDAR/radar/sonar imaging systems are capable of accessing servers with both classical computers and quantum computers so that measurement data are analyzed with networked hybrid classical-quantum machine learning for feature extraction. In some embodiments, the hybrid architecture over the computing graph in the networked DNNs and QNNs is adaptively tuned through automated machine learning (AutoML) framework with either deep reinforcement learning, Bayesian optimization (BO), or meta-heuristic optimization to design quantum ansatz, embedding, measurement circuits, specification, quantization, and hypernetwork architecture to configure variational quantum circuits (VQC). In some embodiments, signal processing for data communications and analysis is further offloaded towards networked hybrid quantum-classical computers, e.g., such as encoding, decoding, modulation, demodulation, equalization, detection, pulse shaping, compression, decompression, denoising, compressed sensing, and so on. The networked hybrid quantum-classical machine learning has a non-obvious benefit that the communications capability is exploited to realize communications and sensing at the same time in conjunction with distributed computing load balancing for classical computers and quantum computers, which can significantly improve performance of signal processing and inference without additional hardware embedding. In particular, the management of multiple CPUs and QPUs at the same time is challenging for the prior-art technologies as the potential number of distribution patterns of the operations towards multiple CPUs and QPUs is enormously large and the precision, latency, power requirement, and fidelity of different CPUs and QPUs vary a lot. The current invention provides a way to control the computing graph over the network to manage a good loading balance for individual CPUs and QPUs so that a total cost and efficiency are well-maintained. In addition, the invention provides a way to integrate QNNs into DNNs in a flexible manner by exploiting the capability of seamlessly reconfigurable distributed computing over network. For example, several portions of signal processing such as convolution layers and activations in DNNs are adaptively distributed to different central computing units (CPUs), graphics computing units (GPUs), field-programmable gate arrays (FGPAs), and quantum processing units (QPUs).

Some embodiments of the present invention provide a system deployed for integrated computing, sensing, and communications, having at least one communication link, at least one classical computing processor configured with a set of trainable parameters, at least one quantum computing processor configured with a variational circuit according to a set of variational parameters, at least one memory bank coupled with the at least one classical computing processor and the at least one quantum computing processor through the at least one communication link, wherein the at least one memory bank stores instructions implementing a set of hybrid classical-quantum computing methods for data communications, machine learning, and environment sensing, wherein the instructions. For instance, the trainable parameters are weights and biases, with many artificial neurons across deep hidden layers which require a large number of arithmetic multiplication and floating-point operations. When executed by the at least one classical computing processor and the at least one quantum computing processor, the instructions carry out at steps of causing the at least one classical processor to exchange data through the at least one communication link, to adjust the set of trainable parameters and the set of variational parameters, and to update data in the at least one memory bank according to the set of computing methods, and causing the at least one quantum processor to measure a quantum state given the set of variational parameters and the data in the at least one memory bank according to the set of computing methods. For instance, the set of the computing methods include an adaptive filtering algorithm, gradient descent algorithm, feature extraction algorithm, classification algorithm, regression algorithm, prediction algorithm, compressed sensing algorithm, estimation algorithm, inference algorithm, deep neural network, machine learning, denoising algorithm, encoding, decoding, modulation, demodulation, or equalization.

According to some embodiments of the present invention, a computer-implemented method is provided for signal processing, communications and sensing, performed by at least one classical computing processor and at least one quantum computing processor, wherein the at least one classical computing processor and the at least one quantum computing processor are coupled through at least one communication link with a memory bank storing instructions implementing a set of hybrid classical-quantum computing methods. The instructions carry out steps of: exchanging a set of data among the at least one memory bank, the at least one classical computing processor, and the at least one quantum computing processor through the at least one communication link; distributing a set of sub-instructions towards the at least one classical computing processor and the at least one quantum computing processor; adjusting a set of variational parameters for the at least one quantum computing processor; adjusting a set of trainable parameters for the at least one classical computing processor; and modifying the set of data according to the set of sub-instructions, the set of variational parameters and the set of trainable parameters.

Accordingly, the embodiments can realize low-power, reduced-hardware signal processing for data communications and sensing with accurate DNN and QNN inference by using networked hybrid quantum-classical computing through communications. It can be used for real-time applications requiring low-power and limited-resource deployment.

BRIEF DESCRIPTION OF THE DRAWING

The accompanying drawings, which are included to provide a further understanding of the invention, illustrate embodiments of the invention and together with the description, explaining the principle of the invention.

DETAILED DESCRIPTION OF THE PREFERRED EMBODIMENTS

Figure 1A:
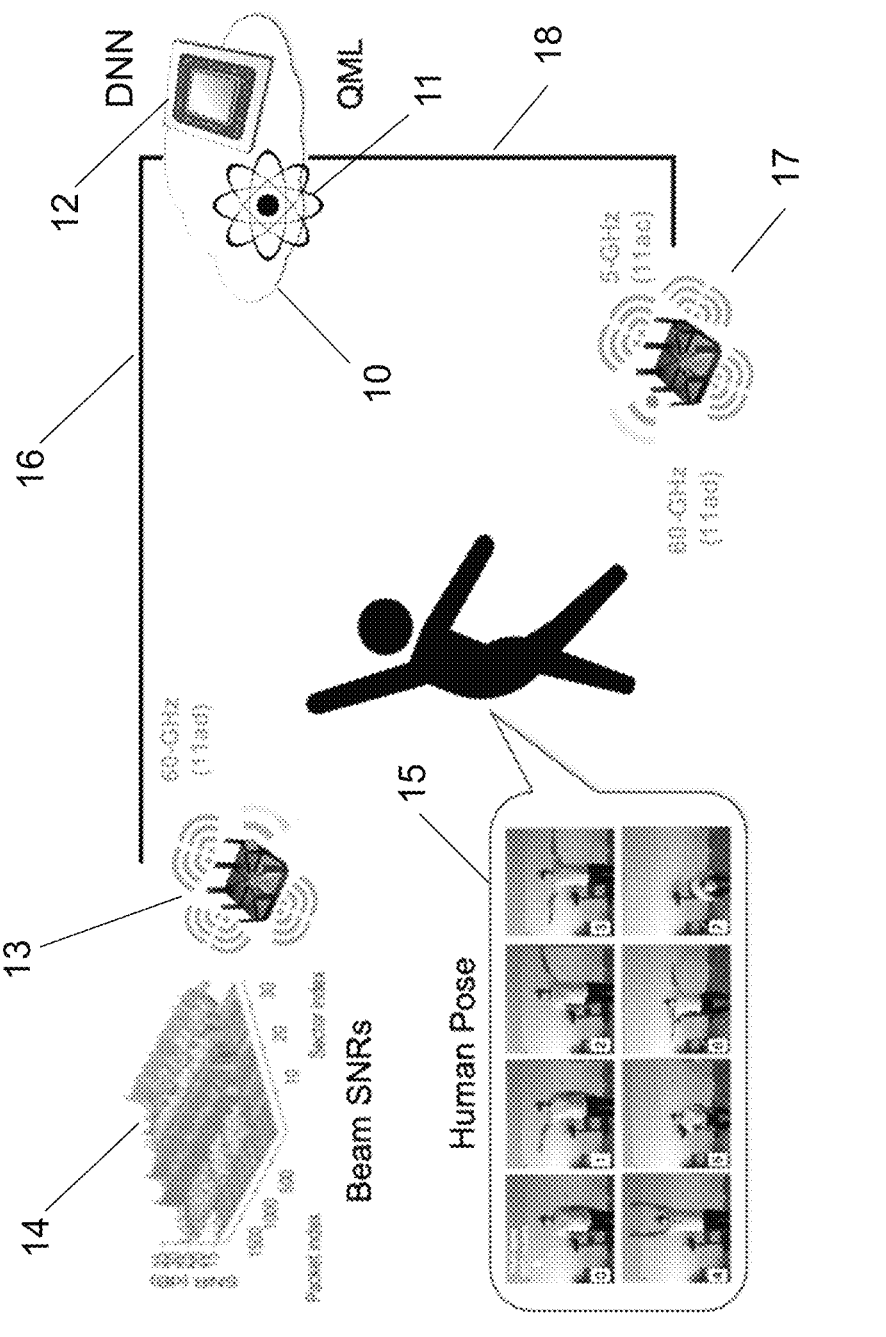
FIG. 1A shows an exemplar system for Wi-Fi human monitoring empowered by networked hybrid quantum-classical machine learning according to some embodiments.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Some embodiments of the present disclosure provide a system and method for integrated sensing and communications (ISAC) empowered by networked hybrid quantum-classical computing to improve performance of signal processing and machine learning while reducing power consumption and hardware resource at communications devices that include cellular phones, Wi-Fi access points, and internet-of-thing (IoT) appliances. The networked hybrid quantum-classical computing is realized with a computing graph over a data communications network using at least one classical computing processor and at least one quantum computing processor so that the load balance over different processors is adjusted to meet a certain requirement including power efficiency, computational precision, and latency to complete. Some other embodiments include but not limited to inference and prediction for digital pre-distortion, channel equalization, channel estimation, nonlinear turbo equalization, speech recognition, image processing, biosignal sensing, LIDAR/radar/sonar/THz imaging, compressed sensing, deep learning, deep reinforcement learning, and so on.

Wi-Fi Sensing for Indoor Monitoring

For Wi-Fi sensing, access point under 802.11 standards can collect beam scanning measurements, which can be associated with a class of human gestures, object behaviors, and environmental changes as a fingerprinting data to learn a deep neural network (DNN) and quantum neural network (QNN) models, by exploiting the capability of the Wi-Fi devices to readily access distributed computers. Specifically, the present invention uses at least one classical computing processor and at least one quantum computing processor over network. Accordingly, some computationally heavy signal processing can be offloaded towards external central processing units (CPUs) and quantum processing units (QPUs). Moreover, the use of quantum computing devices exploiting entanglement and superposition can improve the computational efficiency over the CPUs. Depending on the types of operations, the present disclosure assigns the portions of signal processing diagrams into distributed CPUs and QPUs with a good load balancing for real-time applications. FIG. 1 shows the Wi-Fi human monitoring system empowered by networked hybrid quantum-classical machine learning. This is an extension of Wi-Fi sensing systems which exploit signals for data communications to sense ambient environments by further exploiting the communications capability to access distributed CPUs and QPUs.

FIG. 1A shows an exemplar Wi-Fi sensing system according to the invention. The exemplar configuration uses some Wi-Fi stations 13 and 17 in an indoor environment or a certain outdoor area. This embodiment of the Wi-Fi sensing system enables data communications vir the Wi-Fi stations as well as the environmental sensing, which includes but not limited to human identify recognition, object recognition, human/object counting, human activity/motion detection, human pose/location recognin, vital sign sensing of a subject, and so on. For example, as shown in FIG. 1A, the subject performs some distinct poses including distinct gestures 15 like 'sit', 'stand with left arm lifted', etc. For each pose, the communications devices record training and testing data with different time durations and with sufficient time separation between consecutive sessions. The data can be augmented to improve the Wi-Fi sensing performance for some embodiments.

The Wi-Fi sensing system can efficiently predict the human pose using Wi-Fi signals without relying on other sensing modalities such as cameras, by employing a networked classical-quantum machine learning. While the Wi-Fi stations 13 and 17 establish data access with other wireless devices, the Wi-Fi stations obtain measured wireless signals such as beam signal-to-noise ratios (SNRs) 14 and channel state information (CSI). The measured wireless signals 14 are further used to predict the environmental change such as the human pose 15. The prediction is based on the networked machine learning methods, which are executed at distributed classical computers 12 and quantum computers 11 through data links 16 and 18 for accessing a cloud network 10. The estimated environmental changes are sent back to the Wi-Fi stations.

As super-grained mmWave channel state information (CSI) is typically not accessible from commercial-off-the-shelf (COTS) devices without additional overhead, some embodiments use mid-grained Wi-Fi measurements in the beam angle domain—beam signal-to-noise ratios (SNRs)—generated from the beam training (as known as beam alignment) phase. For each probing beampattern (a.k.a. beam sectors), beam SNR is collected by 802.11ad devices as a measure of beam quality. Such beam training is periodically carried out and the beam sectors are adapted to environmental changes.

For example, the system can use 802.11ad-compliant routers to collect beam SNRs at 60 GHz. The router supports a single stream communication using analog beamforming over a multi-element planar array. From one beam training, one Wi-Fi station can collect several beam SNRs across discrete transmitting beampatterns. The measured beam SNRs are shared with networked CPUs and QPUs via Ethernet cables or different communications links to train DNN and QNN (e.g., through the IBM quantum cloud service). The exemplar system can be deployed in a standard indoor room setting.

The hybrid use of distributed CPUs and QPUs enables a flexible control of computational load balancing in the current invention. As there exist diverse specifications of CPUs and QPUs in the cloud, it is hard to allocate specific operations over different processors due to the enormously large size of possible ways. For example, IBM QPUs have different size of chips accommodating the number of quantum bits (qubits) ranging from 5 to 433. The fidelity, the coherent time, the quantum volume, and the required power consumption also vary a lot. In addition, the availability of cloud CPUs and QPUs changes over the time depending on the demand. The current invention uses a controller to allocate specific operations towards distributed CPUs and QPUs depending on those factors so that the total resource budget is maintained at a target value depending on acceptable precision errors. In addition, the QNN architecture is automatically designed through the use of Bayesian optimization, reinforcement learning or meta-heuristic optimization methods to explore different quantum ansatz so that the inference accuracy is maximized while the circuit size is minimized. With the compact QNN architecture, power-efficient inference is realized.

Quantum Machine Learning (QML) and Transfer Learning

The key challenge of Wi-Fi sensing is that Wi-Fi measurements or the ambient environment can change over measurement sessions and these changes will degrade the efficiency of machine learning models due to the domain shifts. Some embodiments use a networked hybrid quantum-classical transfer learning framework to tackle the domain shift issues.

The present invention is based on the recognition that the quantum machine learning (QML) framework is suited for the Wi-Fi sensing systems, and that the QPU development is rapidly growing. A number of modern DNN methods have been already migrated into quantum domain, e.g., quantum convolutional layer, quantum autoencoder, quantum graph neural network (GNN), and quantum generative adversarial network (GAN). More importantly, QML is more suited for ISAC and Wi-Fi sensing because a cloud quantum server such as IBM Quantum and Amazon braket is readily accessible without additional hardware.

In analogy with DNN, it was proved that QNN holds the universal approximation property (UAP). Accordingly, increasing the number of qubits and quantum entangling layers can enjoy state-of-the-art DNN performance. In addition, quantum circuits are analytically differentiable, enabling stochastic gradient descent (GDS) optimization of QNN. Nevertheless, QNN often suffers from a vanishing gradient issue called the barren plateau. To mitigate the issue, a simplified 2-design (S2D) ansatz was proposed to realize shallow entanglers for nearly arbitrary unitary approximation. As classical deep learning has become extremely energy intensive, it is of importance to offload the heavy signal processing from CPUs to QPUs for a future sustainable computing.

Figure 1B:
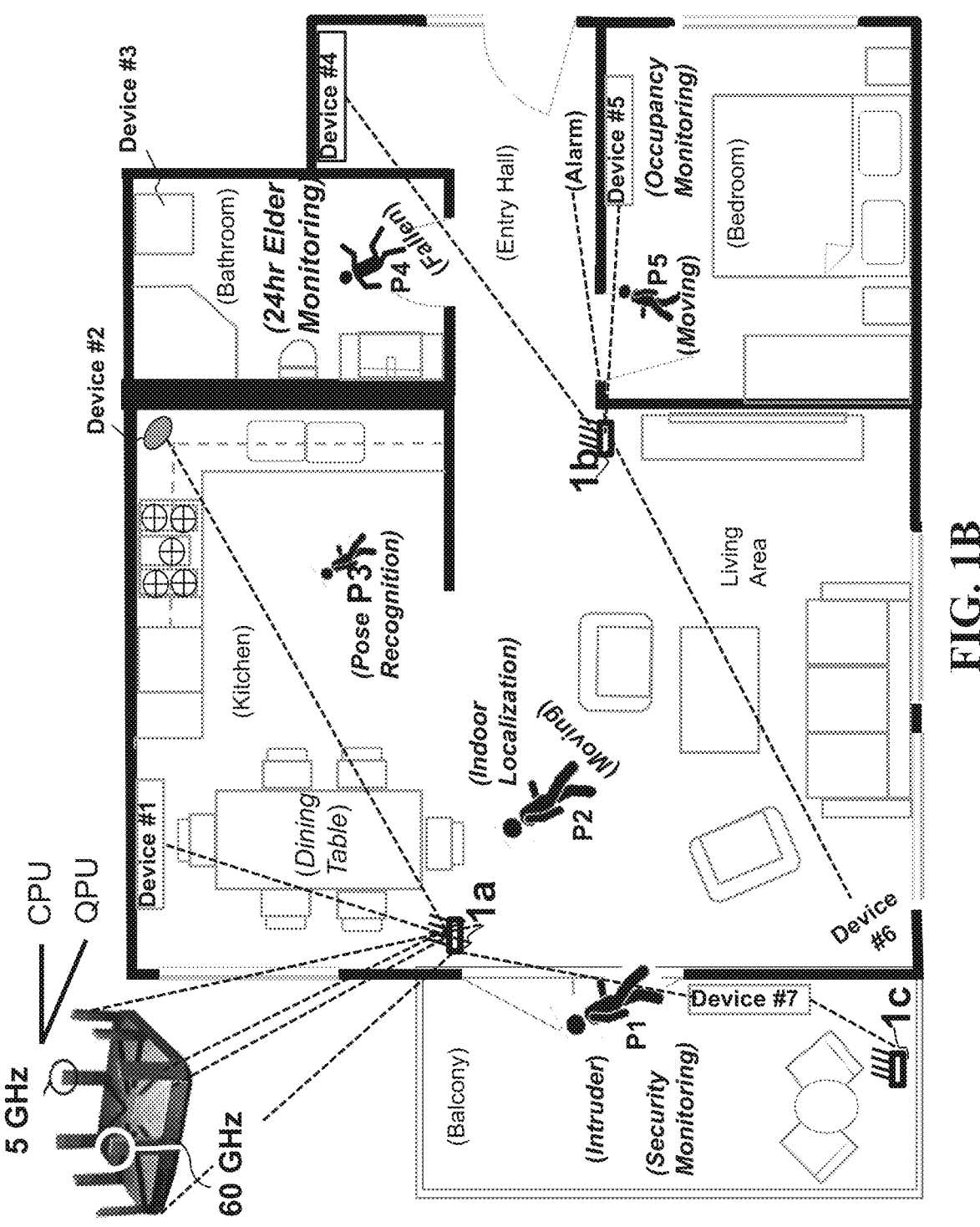
FIG. 1B shows an exemplar deployment of Wi-Fi indoor monitoring systems empowered by networked hybrid quantum-classical machine learning according to some embodiments.

FIG. 1B shows various other scenarios of ISAC systems in some embodiments. For example, the system can sense intruders for security monitoring, indoor localization for moving person, pose recognition, fallen detection of elder monitoring, motion detection, occupancy monitoring, and so on.

Figure 2A:
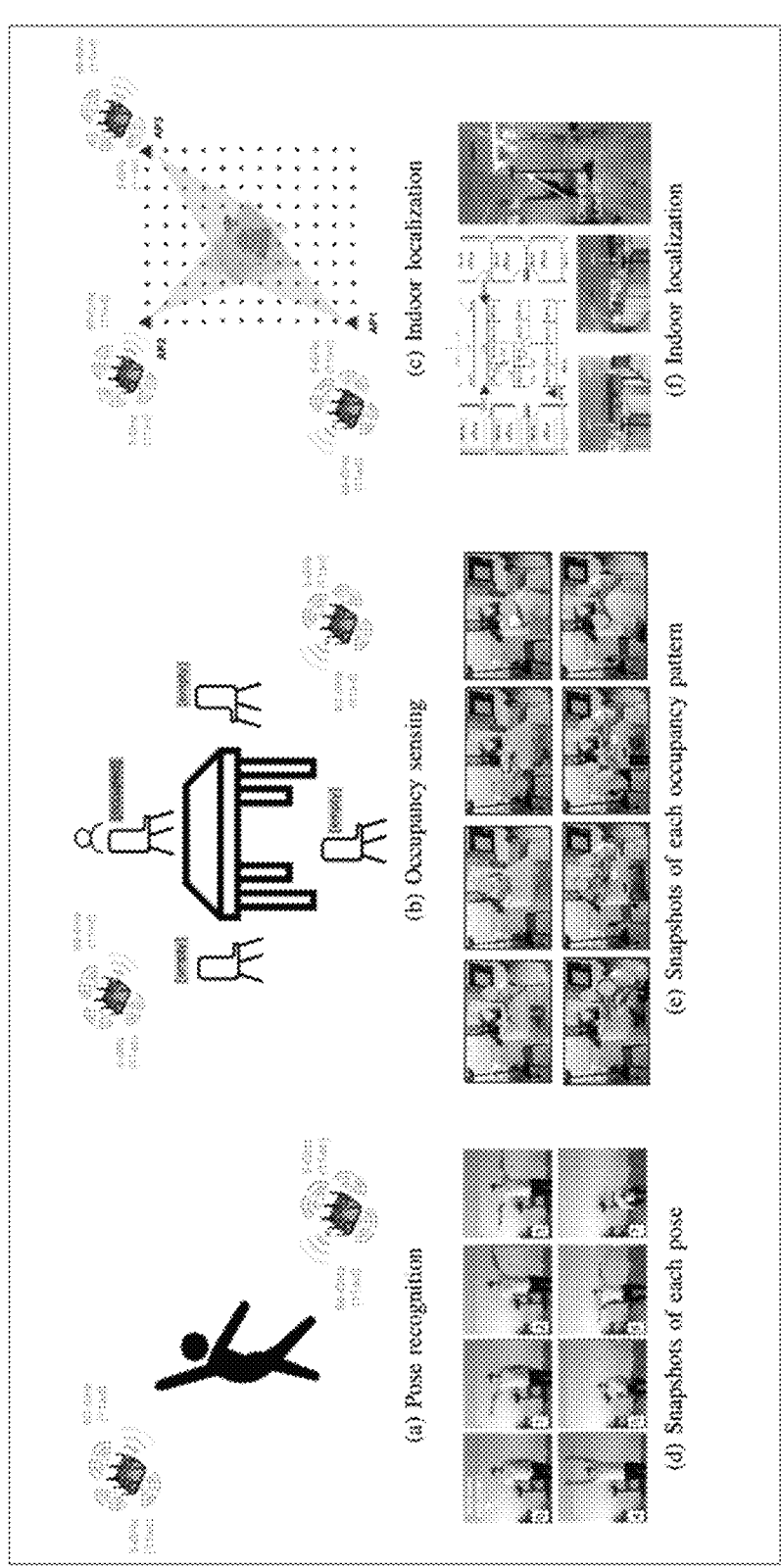
FIGS. 2A and 2B show exemplar scenarios for Wi-Fi indoor monitoring systems according to some embodiments.
Figure 2B:
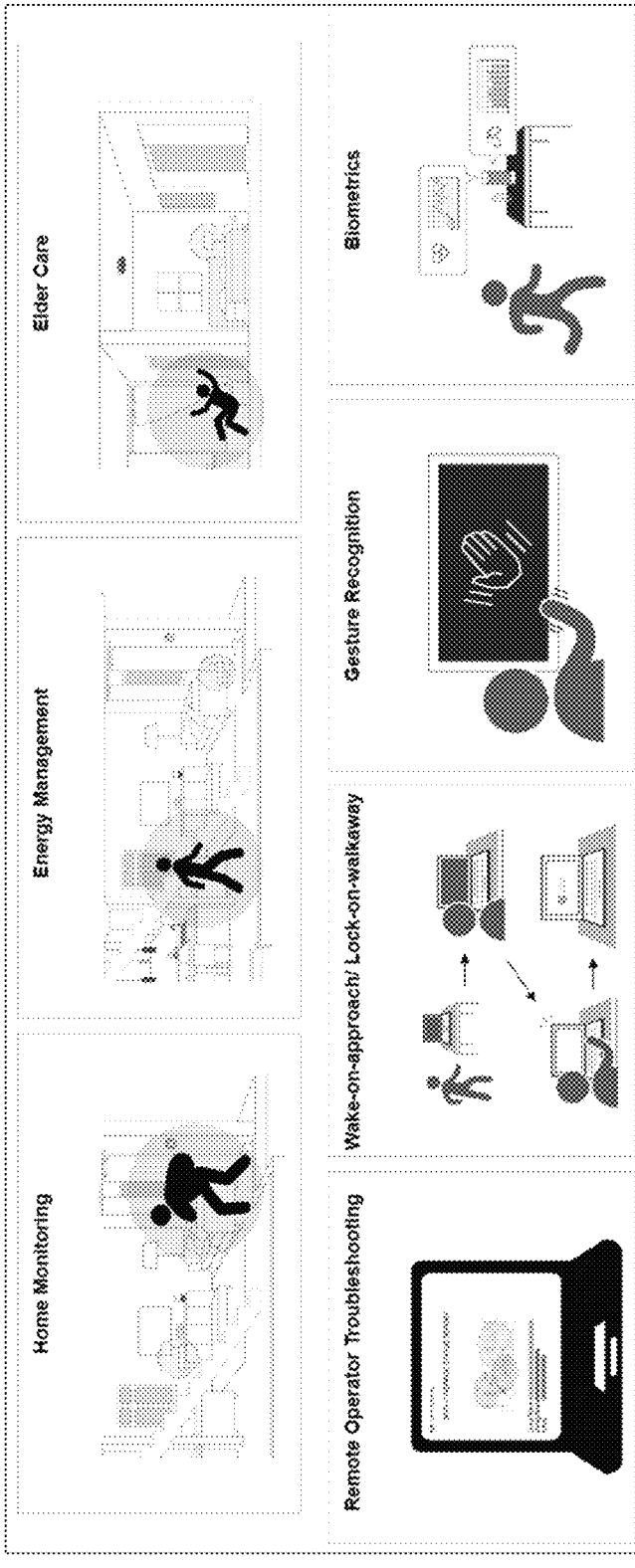

FIG. 2A shows exemplar scenarios of pose recognition, occupancy sensing, and localization for Wi-Fi sensing according to some embodiments. FIG. 2B shows exemplar scenarios of security monitoring, energy management, elder care, remote operation, gesture recognition, and biosignal processing.

Figure 3A:
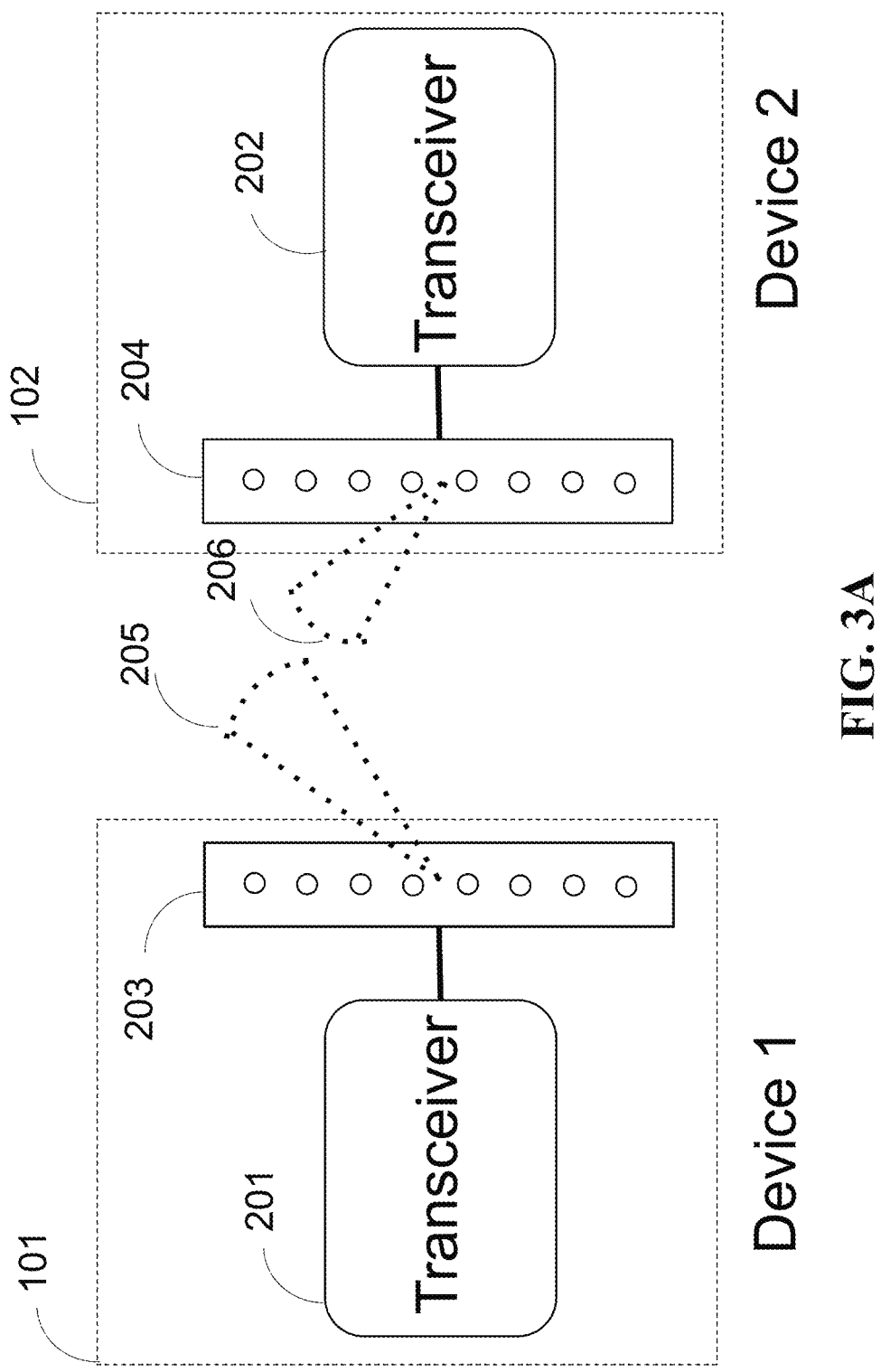
FIG. 3A and FIG. 3B show exemplar transmitter and receiver systems for integrated communications and sensing according to some embodiments.
Figure 3B:
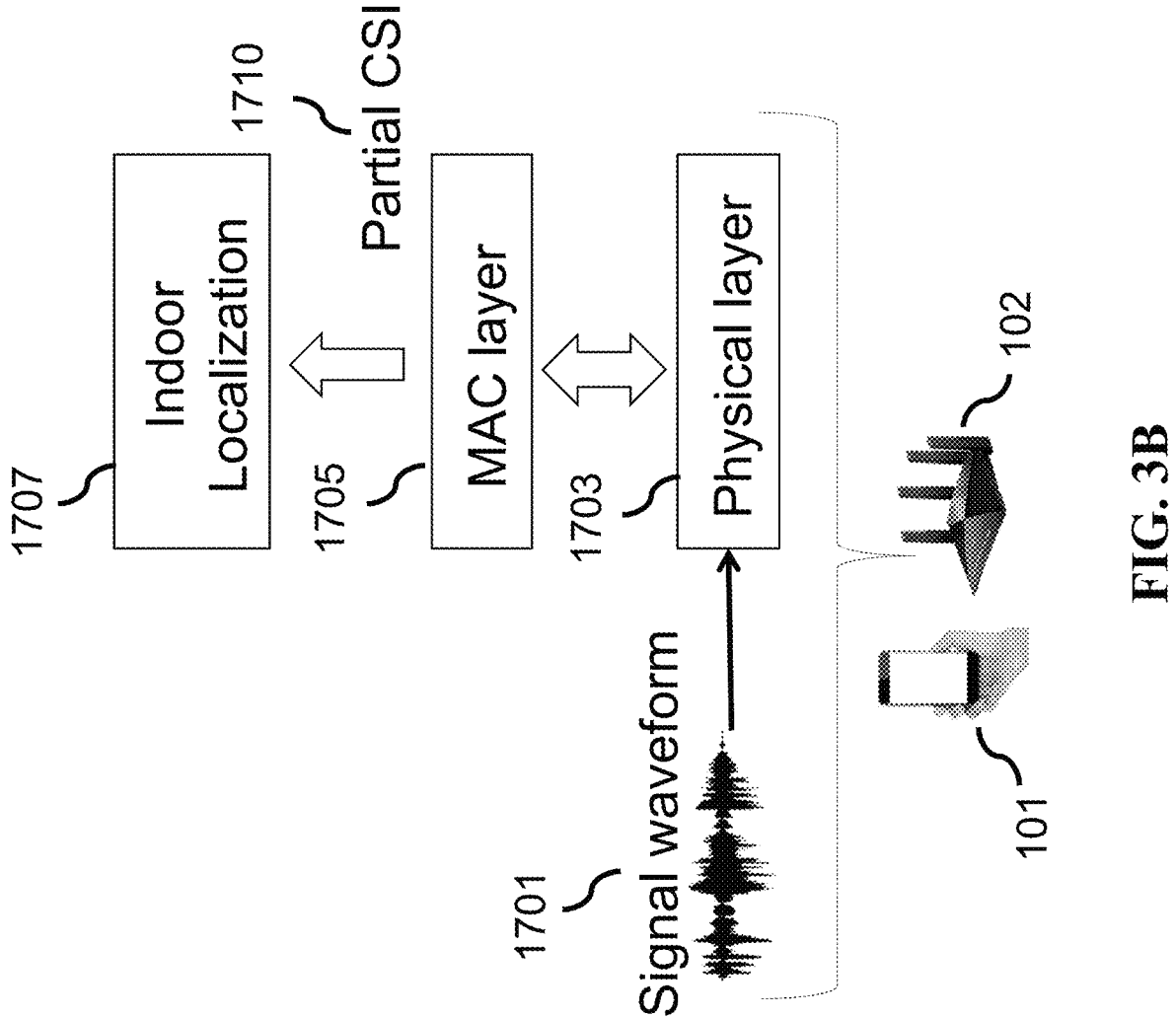
Figure 4A:
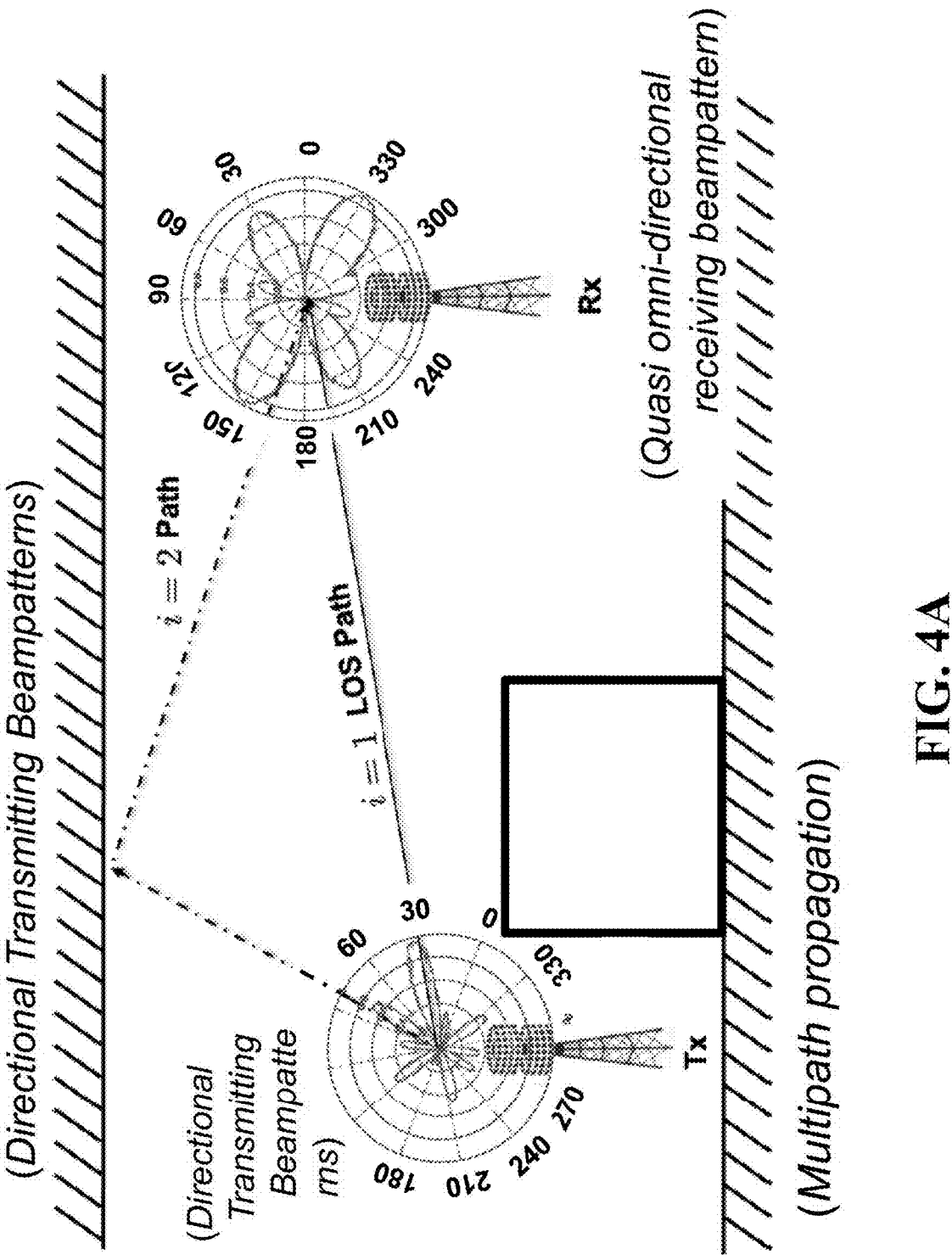
FIG. 4A, FIG. 4B, and FIG. 4C show exemplar illustrations of communications channels for joint data exchange and sensing according to some embodiments.
Figure 4B:
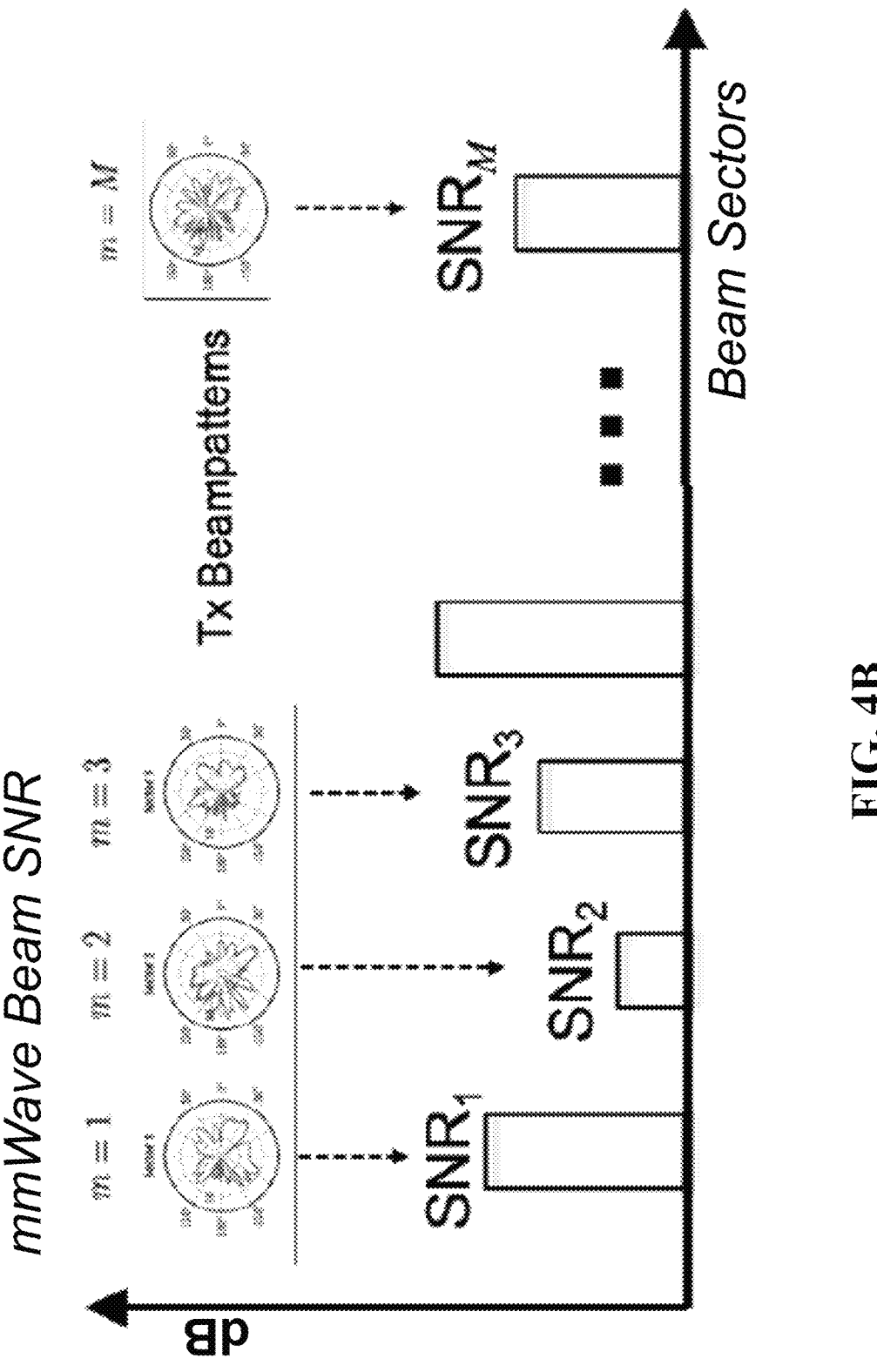
Figure 4C:
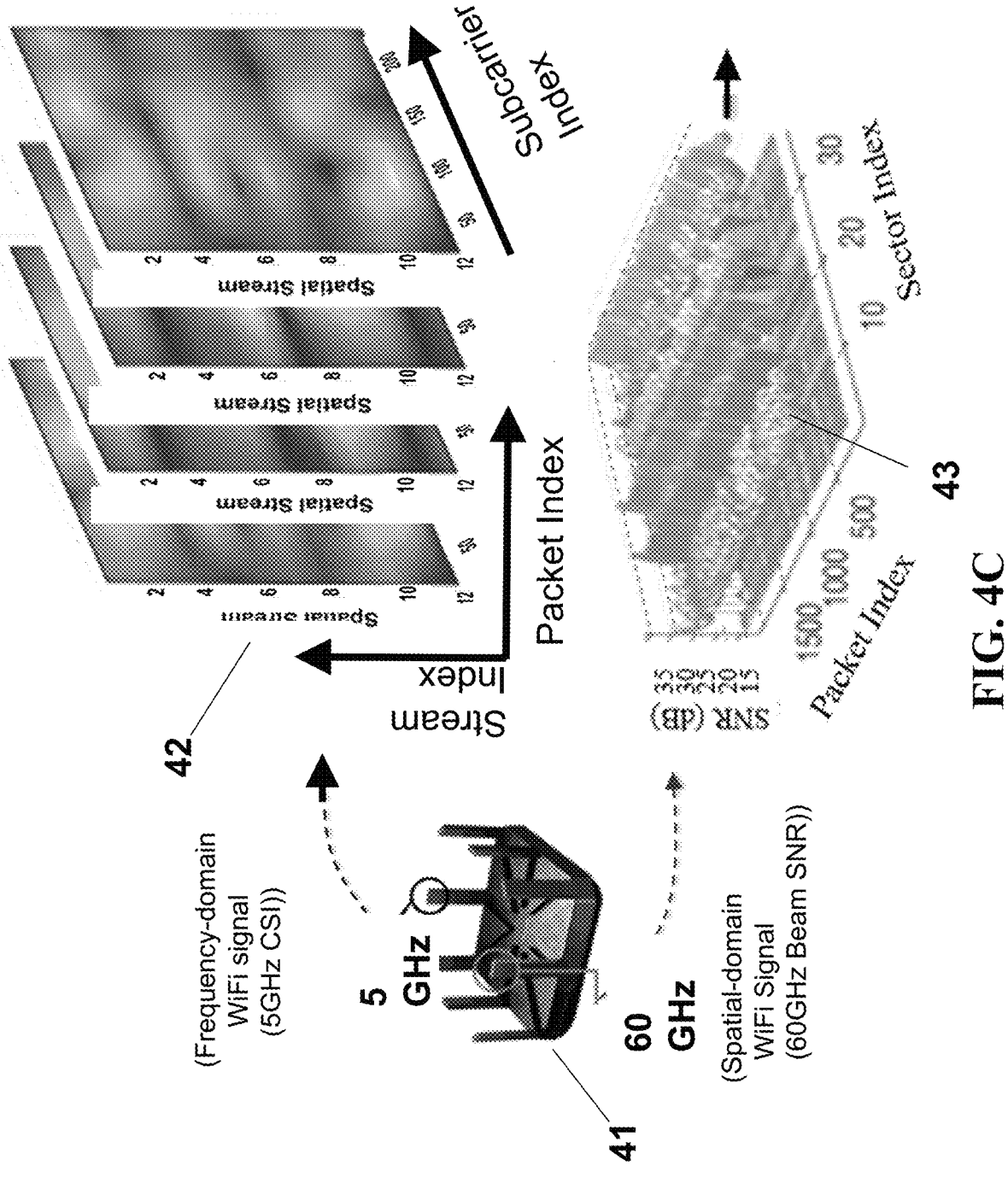

FIGS. 3A and 3B show exemplar communications channels which depend on environmental conditions, enabling the environmental sensing based on communications channel measurement without relying on external sensors. A communication device 101 sends a radio wave through a transmitter 201 by using multiple antenna elements 203 to form a beam 205 towards the channel. Another communication device 102 receives a radio wave through a receiver 202 by using multiple antenna elements 204 to form a beam 206. Using the beam information and channel measurement, this exemplar system enables environmental sensing as well as a primary function of the data communications. The transmitter 101 can be a handheld phone for example, and the receiver 102 can be a Wi-Fi access point. The Wi-Fi access point receives the signal waveform 1701 from the channel, and the waveform is modified by physical layer operations 1703 such as equalization and demodulation. The waveform is further modified by the medium access control (MAC) operations 1705 such as packet synchronization and scheduling. In physical layer, full CSI information can be used for environmental sensing. In MAC layer, partial CSI 1710 or beam SNRs can be used instead. The environmental sensing includes indoor localization 1707 of the handheld phone 101 for example. Especially, radio waves from multiple antennas in millimeter wave (mmWave) bands have a rich spacial feature as shown in FIG. 4A, FIG. 4B, and FIG. 4C. Through Wi-Fi station 41, fine grained channel state information (CSI) 42 over subcarrier spectrums and mid-grained beam signal-to-noise ratio (SNR) 43 can be jointly used for some embodiments to complement the physical characteristic of different radio bands.

Figure 5:
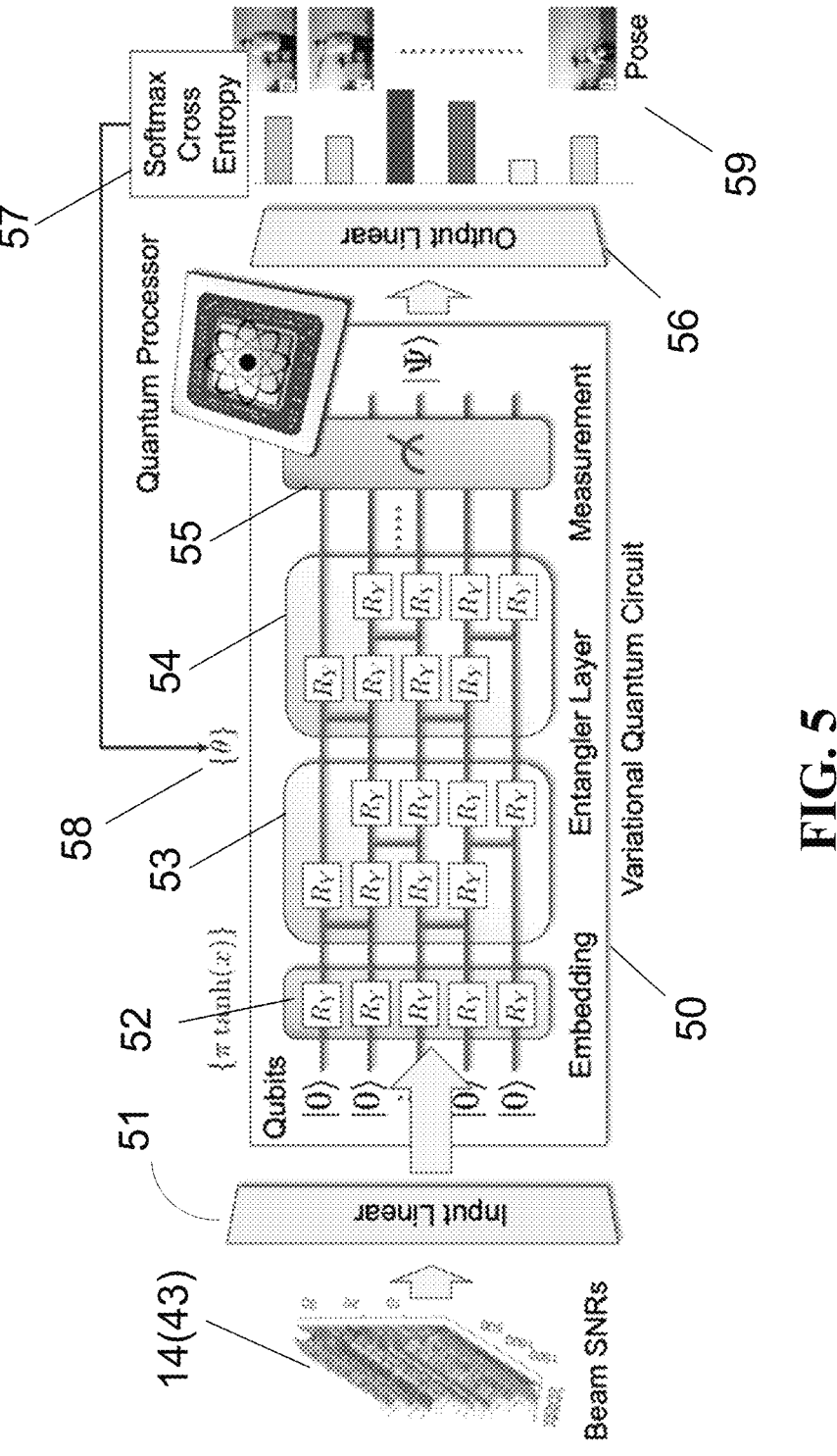
FIG. 5 shows an exemplar schematic of quantum neural network using based on a variational quantum circuit for Wi-Fi sensing according to some embodiments.

FIG. 5 depicts an exemplar QNN model used for Wi-Fi sensing, employing S2D ansatz, which consists of Pauli-Y rotations and staggered controlled-Z entanglers. This ansatz is a variational quantum circuit (VQC) 50 based on a simplified variant of a 2-design circuit whose statistical properties are identical to ensemble random unitaries with respect to the Haar measure up to the first 2 moments. For an n-qubit variational quantum circuit 50, there are $2(n-1)L$ variational parameters $\{\theta\}$ 58 over an L-layer S2D ansatz. The VQC has a quantum state preparation module, state evolution module, and a state measurement module. The beam SNR measurement data 14 are first fed into the VQC through a preprocessing layer 51 and the preprocessed data are embedded into the VQC via an angle embedding layer 52. The embedding layer prepares the quantum state. It includes the angle embedding, amplitude embedding, quantum approximate optimization algorithm embedding, IQP embedding, Mottonen state preparation, and so on. After the state preparation module, the state evolution module is executed. As the state evolution module, the entangling layers 53 and 54 are repeated L times. After the entangling layers, the state measurement module 55 is used to convert quantum state into classical data. The quantum measurement module includes expected value, probability, sample, variance, and so on. For the quantum state preparation, angle embedding or amplitude embedding is used for some embodiments. The quantum state evolution module can use different ansatz as shown in FIG. 6, e.g., quantum approximate-optimization algorithm (QAOA) ansatz, tree-tensor network (TTN) ansatz, matrix product state (MPS) ansatz, multi-scale entanglement renormalization ansatz (MERA), strongly entangling layer ansatz, basic entangler ansatz, random layer ansatz, continuous variable (CV) neural network layers, and so on. After the quantum measurement 55, the measured data are postprocessed by output layer 56, which provides a score of predictions such as human poses 59. The predicted class is then quantified by a loss function such as cross entropy loss 57 to update the quantum variational parameters 58 through a gradient method, meta-heuristic optimization method or its variant.

To feed multi-dimensional beam SNRs, an input linear layer is used at CPUs to initialize the quantum state at QPUs for rotation angles of Pauli-Y gates for some embodiments. The multi-class pose estimation is provided by quantum measurements in the Hamiltonian observable of Pauli-Z operations, followed by an output layer to align the dimension for some embodiments. The variational parameters as well as trainable parameters for the input/output layers are optimized by the adaptive momentum gradient method to minimize the softmax cross entropy loss. While QNN is not necessarily better than DNN in prediction accuracy, it can be computationally efficient by manipulating $2^n$ quantum states in parallel with a small number of quantum gates.

Figure 6A:
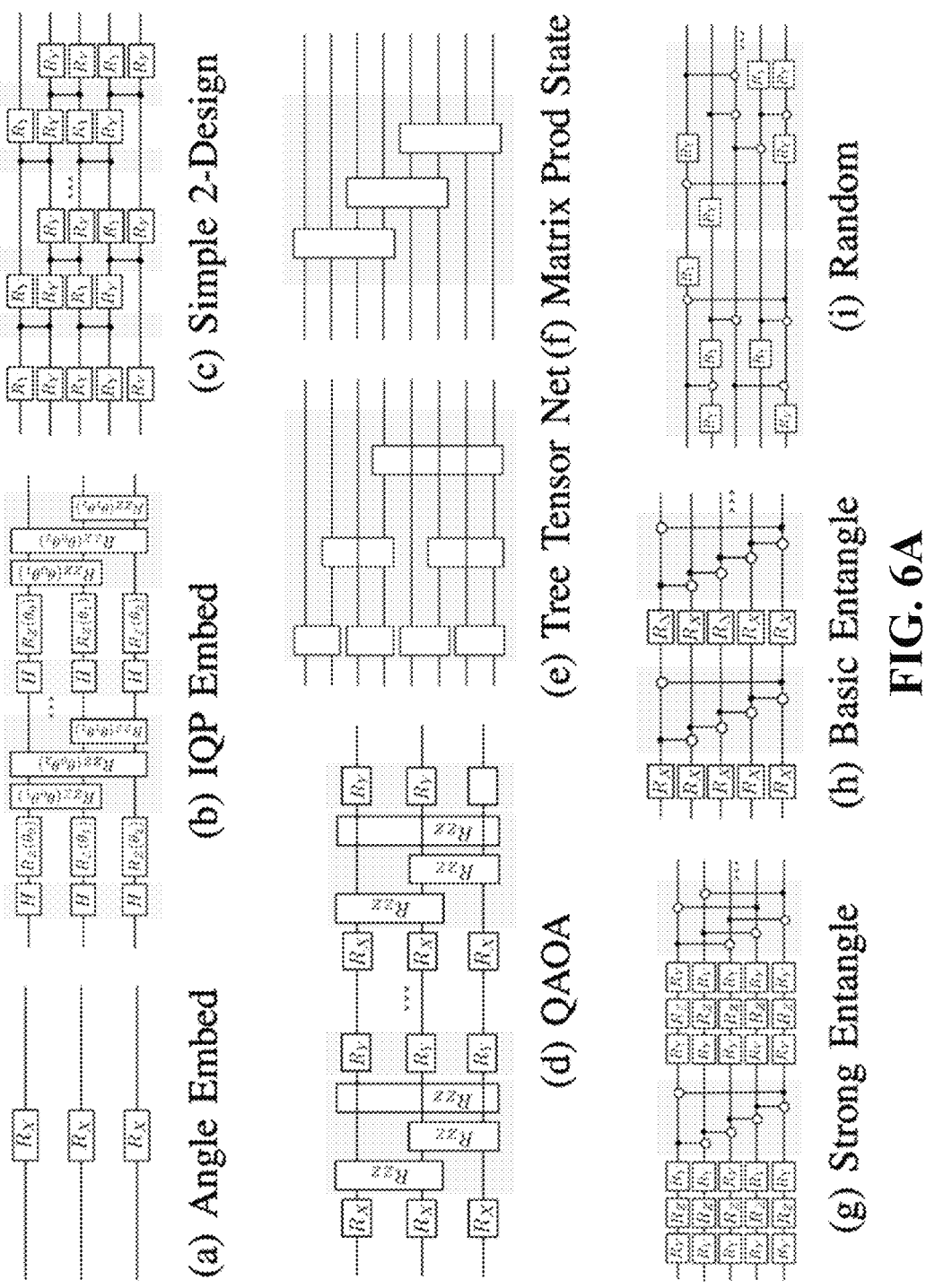
FIG. 6A shows exemplar types (a)-(i) of viriational quantum circuit based on typical ansatz according to some embodiments.

The best QNN hyperparameters (e.g., the qubit size n and layer size L) highly depend on datasets, and thus a considerable amount of manual effort is required to tune them in general. In addition, there are various types of quantum ansatz in literature to explore. The present invention provides a way to automatically tune the hyperparameters for networked hybrid DNN and QNN architectures, by exploring various choices of ansatz suited for distributed CPUs and QPUs. FIG. 6A illustrates some potential ansatz: angle embedding; IQP embedding; QAOA; tensor network such as TTN, MPS and MERA; basic entangler; strongly entangling layers; random layers. Some embodiments use an automated machine learning framework (AutoML) to optimize the QNN ansatz and hyperparameters.

Figure 6B:
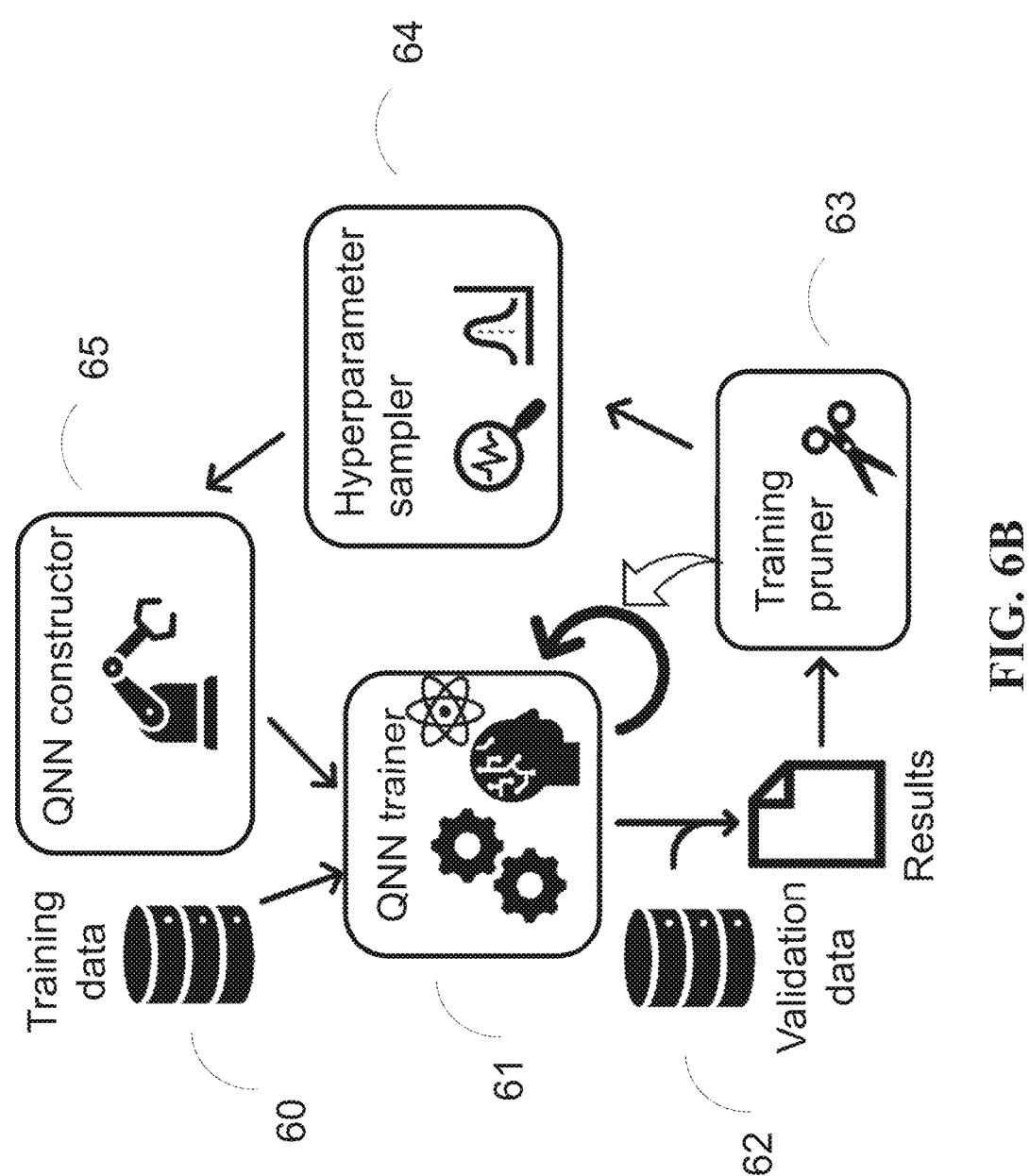
FIG. 6B shows exemplar method to design QNN ansatz and hyperparameters through AutoML framework according to some embodiments.

FIG. 6B shows exemplar method to design QNN ansatz and hyperparameters through AutoML framework according to some embodiments. The automatic design method of QNN ansatz and hyperparameters searches for the best QNN circuits by using a training data 60, which are further used to train a candidate QNN circuit 61. Using the validation data 62, the candidate QNN circuit is profiled and a pruning mechanism 63 can stop training operations when the candidate profile is less potential. When no pruning is needed, the profile information is used to decide how to sample the next candidate 64. According to the sampled candidate values, a new QNN circuit is constructed 65 to re-train. For example, some embodiments use Bayesian optimization (BO) based on tree-Parzen estimator (TPE) and hyperband pruning for efficient exploration of different hyperparameters. It automatically explores the diverse set of quantum ansatz, qubit size, and layer size as well as learning rate, without the need of human effort in ansatz/hyperparameter tuning for some embodiments.

The current invention is based on the recognition that the design of QNN ansatz is not straightforward due to the barren plataoue issue where randomly chosen QNN circuits have exponentially decaying gradient variance. Also the current invention is based on the recognition that the QNN can be compact over the DNN because the exponentially large state spaces can be expressed with respect to the number of qubits. The method and system of the current invention provides a way to realize the compact and power-efficient QNN design by taking into account of the trainability and the size of the QNN ansatz at the same time. Specifically, shallower and smaller QNN ansatz are explored by the BO and RL optimization methods to tackle the barren plataue issue. In addition, the networked hybrid quantum-computing processing according to the invention controls the allocation of QNN and DNN operations towards multiple QPUs and CPUs so that the total resource budget is maintained within a target range. The use of hybrid QPUs and CPUs over network can provide a high flexibility to adjust the work load depending on the demand and acceptable precision. In addition, the QNN layers can be integrated with the DNN layers in a seamless manner by using the capability of networked CPUs and QPUs. The AutoML framework in FIG. 6B is further extended for some embodiments to automatically design the allocation of the operations towards multiple CPUs and QPUs in the network besides the quantum ansatz.

Figure 6C:
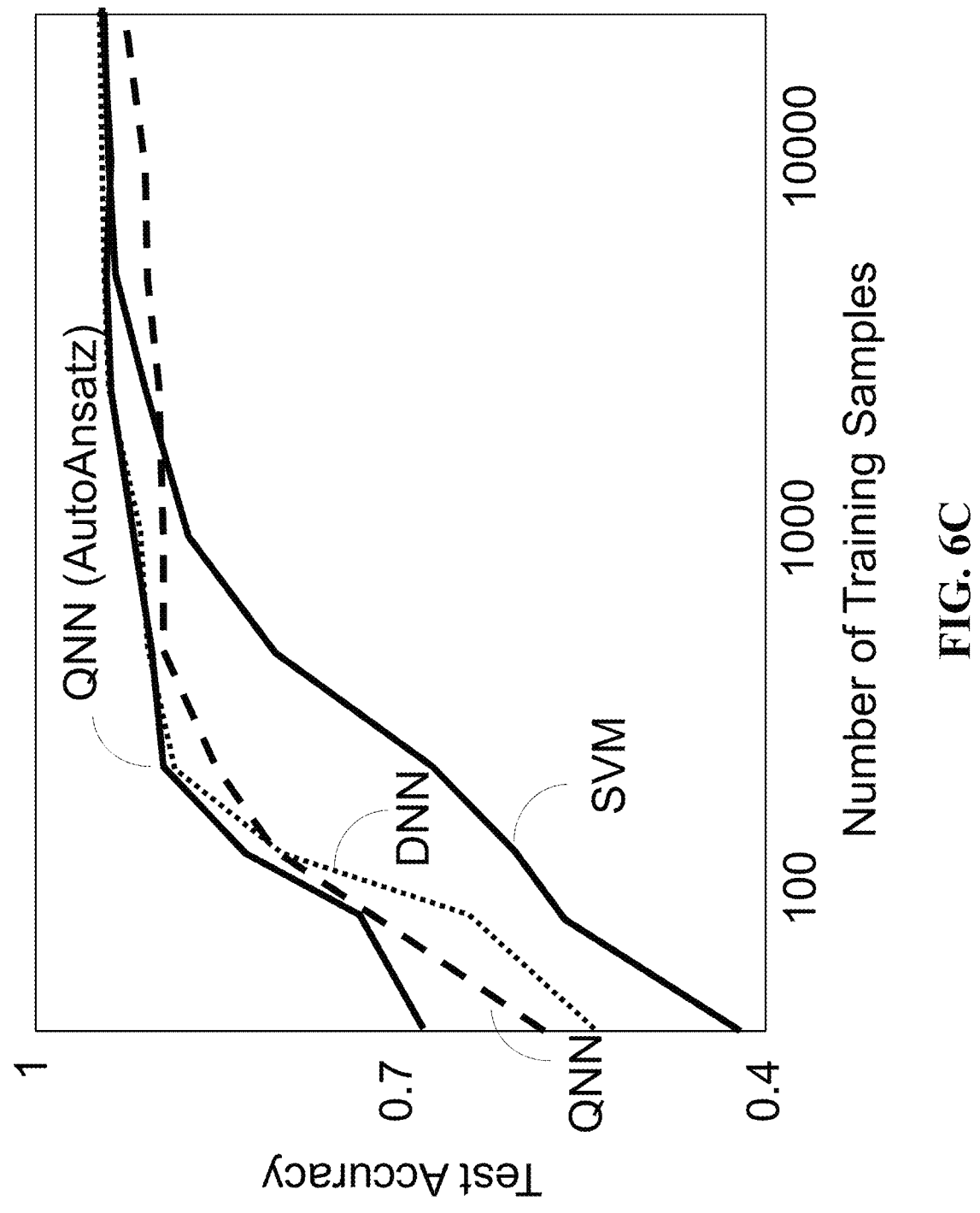
FIG. 6C shows exemplar performance plots of different inference methods compared with hybrid DNN and QNNs designed by automated ansatz for Wi-Fi sensing systems according to some embodiments.

FIG. 6C shows exemplar performance plots of different inference methods compared with hybrid DNN and QNNs designed by automated ansatz for Wi-Fi sensing systems according to some embodiments. It shows the benefit of the current invention in an experiment. The experimental configuration uses two Wi-Fi stations: one station in front of a subject and another station behind the subject. Both stations are placed on a stand of a height of 1.2 meters with a distance of approximately 2 meters. The subject is asked to perform a total of 8 poses. For each pose, 7 independent measurement sessions are recorded with different time duration. The first four sessions are used as a training data and those in the last three sessions as a testing data. The total number of measurement samples is 42,915 and 1,040 in the training and testing, respectively. We use 802.11ad-compliant TP-Link Talon AD7200 routers to collect beam SNRs at 60 GHz. This router supports a single stream communication using analog beamforming over a 32-element planar array. From one beam training, one Wi-Fi station can collect 36 beam SNRs across discrete transmitting beampatterns. AutoQML (AutoAnsatz) explores 2,000 trials of hyperparameter tuning, where each model is trained with adaptive momentum gradient method over a maximum of 100 epochs. The Bayesian optimization uses categorical sampling of different ansatz ((c)-(i) in FIG. 6A) and different embedding methods ((a) and (b) in FIG. 6A). The number of qubits and the number of entangler layers are also sampled from a range of 5-15 and 1-5, respectively. In addition, the initial learning rate is optimized from a range of 10-3-10-1, while the learning rate is adaptively decreased on plateau of training loss by a factor of 0.5 over a patience of 10 epochs. FIG. 6C shows the test accuracy as a function of the number of labeled training samples. The performance can exceed an accuracy of 90% for DNN, QNN, and SVM when a sufficient amount of labeled data is available. It is confirmed that a small-scale QNN designed by AutoQML can improve the baseline QNN model, achieving state-of-the-art performance, slightly better than a large-scale DNN. More specifically, the QNN model is configured with 12 variational parameters, while the DNN model requires 3,500 trainable parameters. Using the QNN, the computational complexity can be greatly reduced for Wi-Fi sensing and human monitoring systems. According to the functional analysis of variance (fANOVA) score, it is found that the choice of quantum ansatz is the most important hyperparameter, more influential than learning rate parameter.

Compressed Sensing and Communications

Figure 7:
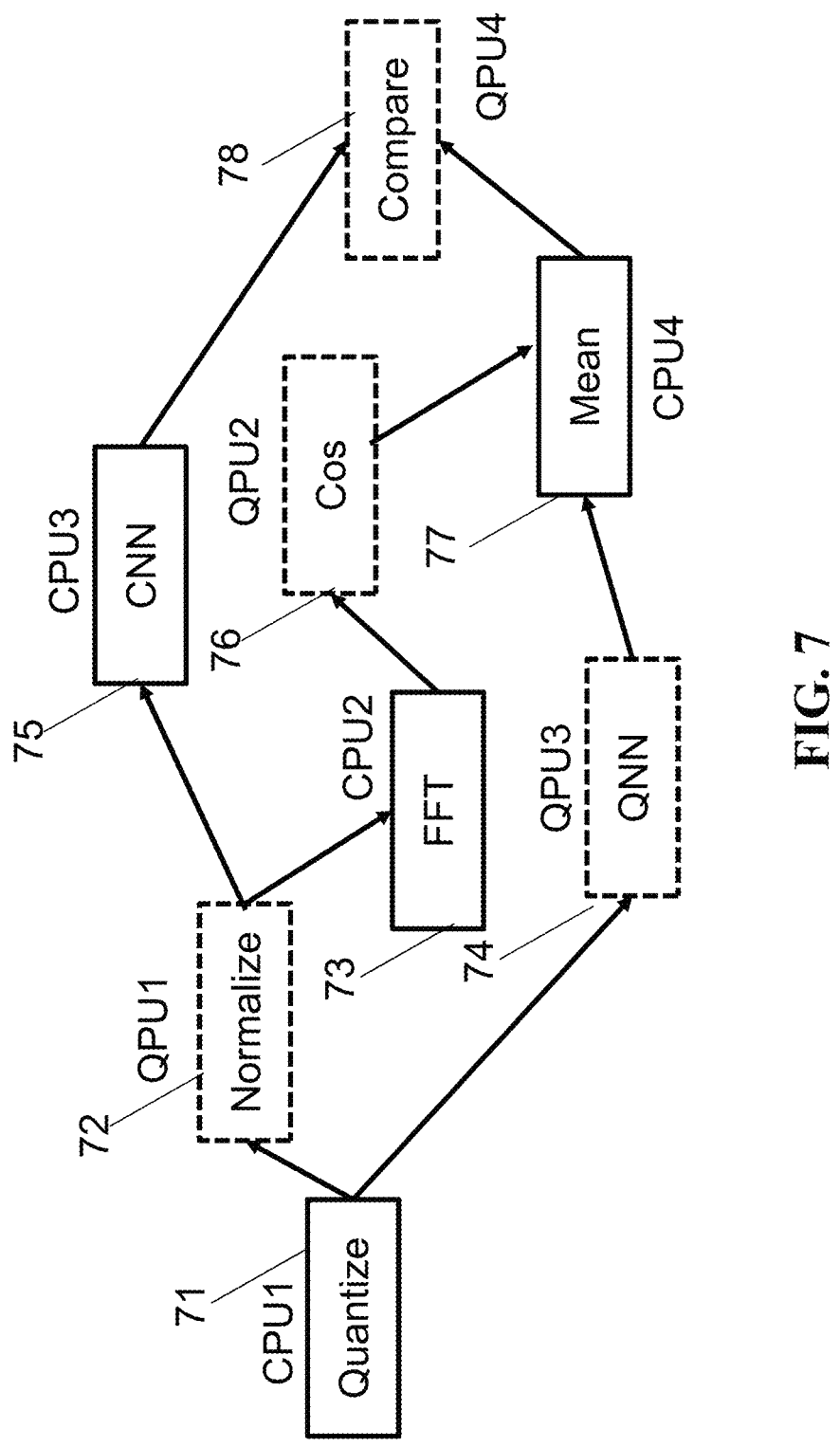
FIG. 7 shows an exemplar block diagram of a computing graph representing a signal processing distributed to multiple conventional computing processors and quantum computing processors in networked hybrid quantum-classical computing according to some embodiments.

The present invention provides a way to distribute operations in signal processing methods for data communications and sensing towards multiple CPUs and QPUs in network. FIG. 7 shows an exemplar diagram of signal processing, where portion of operation modules such as quantization 71, normalization 72, fast Fourier transform (FFT) 73, QNN 74, cosine 76, convolutional neural network (CNN) 75, QNN 74, mean 77, and comparison 78 are assigned to different CPUs and QPUs. The signal processing diagram determines the computational graph over networked hybrid quantum-classical computing. The trainable parameters for CPUs 71, 73, 75, 77 and variational parameters for QPUs 72, 74, 76, 78 can be adjusted by backpropagating a loss gradient along the computing graph for some embodiments. The present invention provides a way to control the operation assignments over distributed CPUs and QPUs depending on the specifications of the processors such as required power consumption, latency to complete the operations, and accuracy of the operations. The controller searches for the best combinations to enable power-efficient quantum-classical computing through the use of Bayesian optimization, reinforcement learning, or meta-heuristic optimization methods.

Figure 8A:
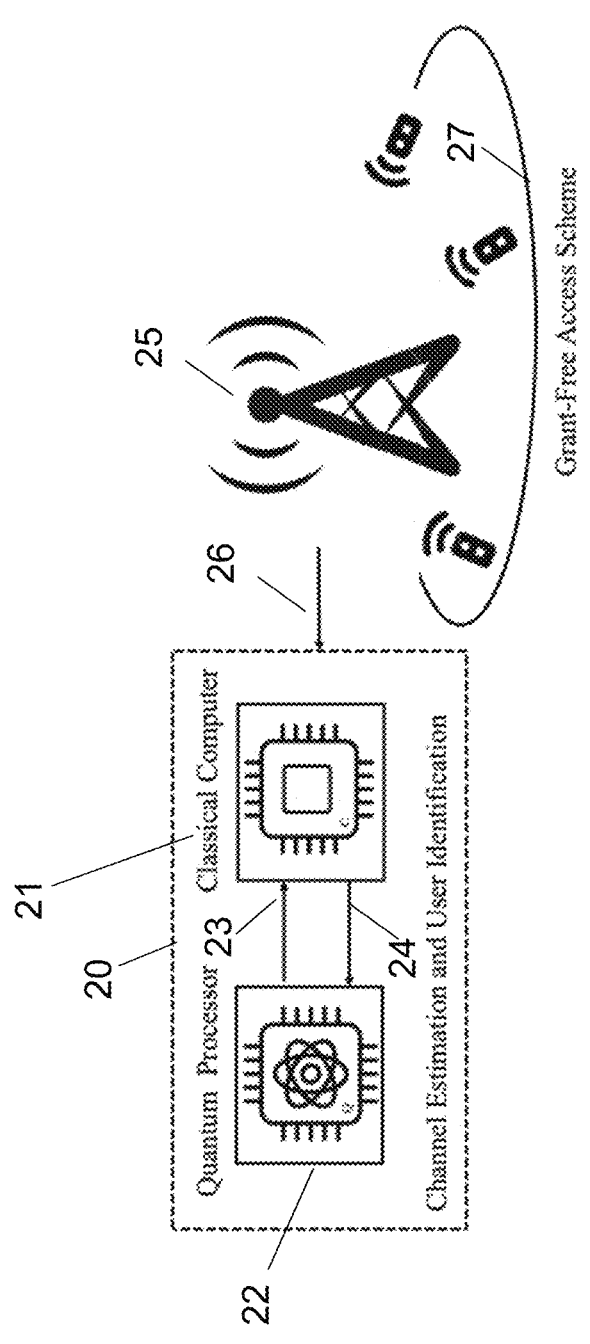
FIG. 8A shows an exemplar system for IoT radio monitoring systems empowered by networked hybrid quantum-classical machine learning according to some embodiments.

FIG. 8A also shows an exempler system used for multi-user multi-device communications, where grant-free internet-of-things (IoT) devices are connected with a communications device. In this embodiment, multiple IoT devices 27 access the wireless base station 25 at the same time. The base station 25 offloads the time-consuming signal processing towards distributed CPUs 22 and QPUs 21 through a communications link 26. The CPUs 22 and QPUs 21 run collaborative operations by exchanging messages over links 23 and 24 so that the channel estimation and user identification for the grant-free IoT communications are enabled at a reduced computing power. With the use of networked hybrid quantum-classical computing 20, many devices can be jointly accessed by quantum multi-user detection, turbo equalization, and compressed sensing.

For some embodiments, such a hybrid quantum-classical computing is used for grant-free wireless access systems having unspecified number of devices to communicate with a base station which is empowered by a quantum processor. Such a wireless network follows a compressed sensing (CS) problem to estimate the presence of devices, e.g., narrowband Internet of things (NB-IoT) systems.

Although most CS methods assume i.i.d device activity, typical grant-free network may face a correlated user activity due to shared medium environment. One of state-of-the-art CS techniques is known orthogonal approximate massage passing (OAMP) algorithm. The OAMP algorithm can usually achieve a better convergence performance than conventional CS techniques, such as the fast iterative soft-thresholding algorithm (FISTA) and standard AMP algorithm. The OAMP algorithm inherits the two-step iterative processes: a decorrelated linear estimation (LE) step and a divergence-free nonlinear estimation (NLE) step. The OAMP alternating process maintains the orthogonality between the estimation errors of LE and NLE, achieving an outstanding convergence performance for solving the linear recovery problem in general.

The present invention provides a way to improve the CS methods by using networked hybrid quantum-classical processing. Specifically, some embodiments integrate a quantum circuit into a compressed sensing algorithm so that the correlation between the device activities can be exploited by the VQC-based denoising in the NLE step.

Figure 8B:
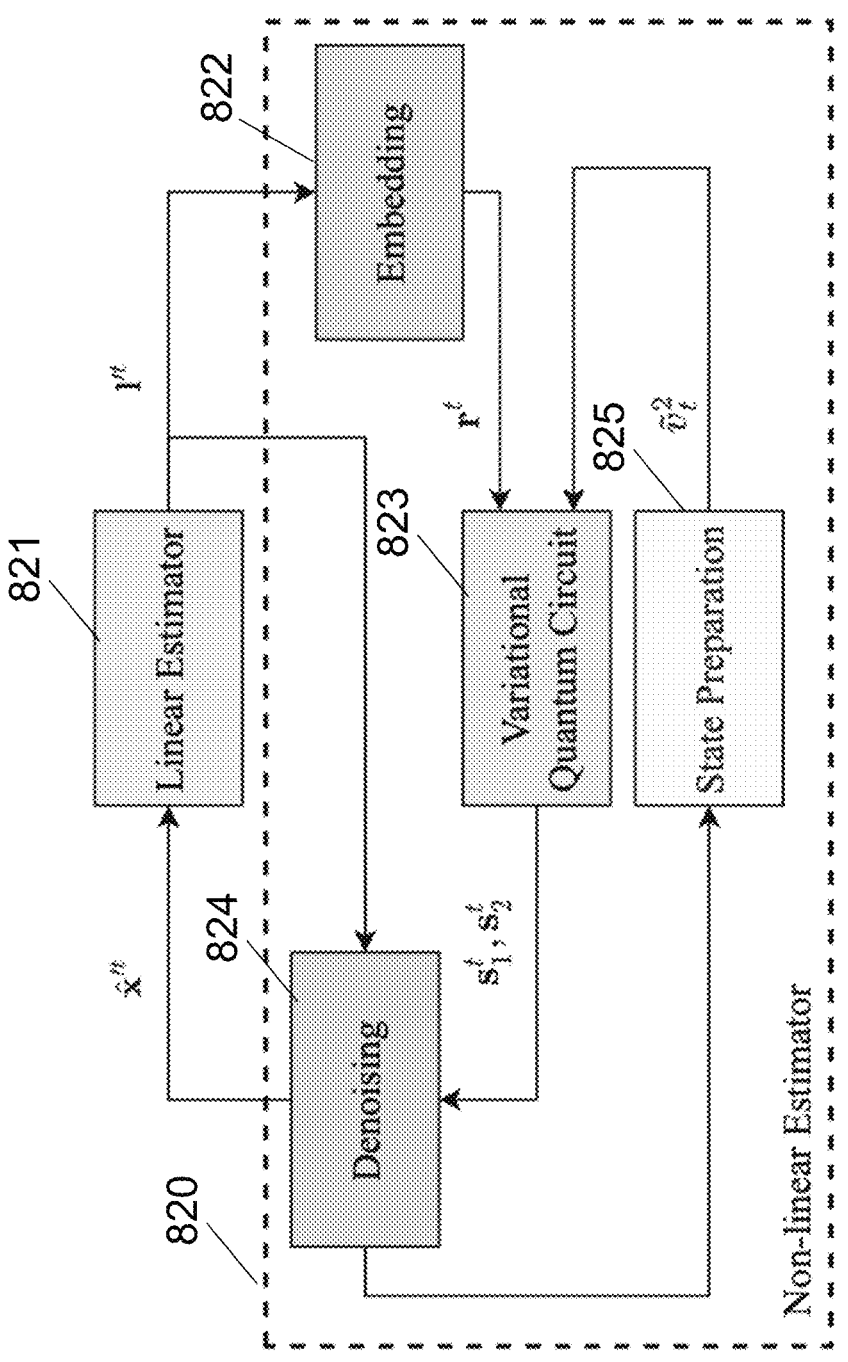
FIGS. 8B, 8C and 8D show exemplar block diagrams for networked hybrid quantum-classical computing according to some embodiments.
Figure 8C:
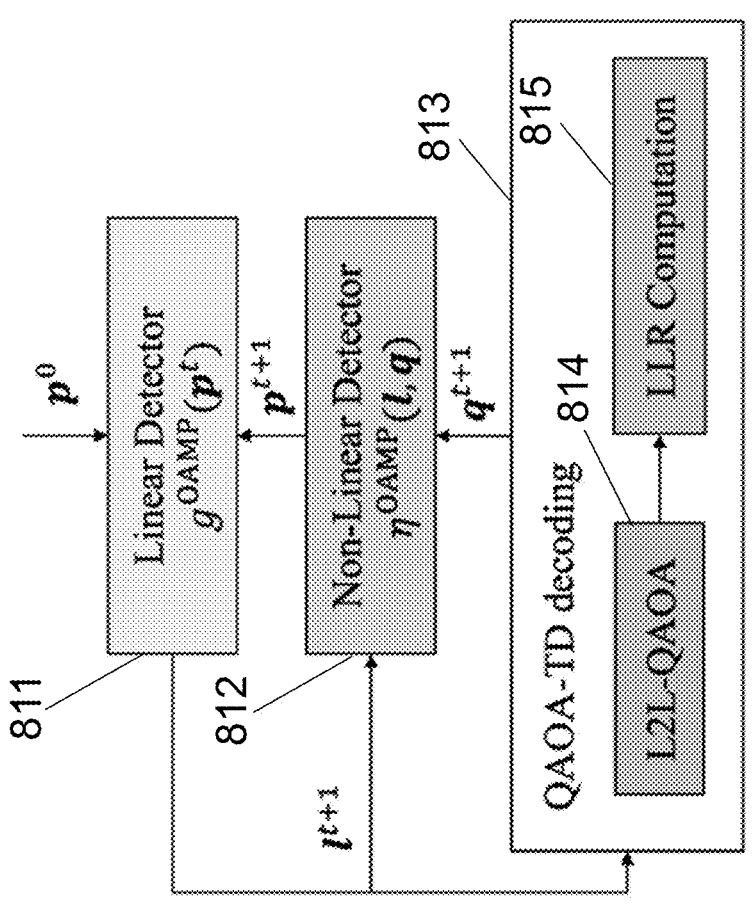

FIGS. 8B and 8C show exemplar schematics of such VQC-based compressed sensing, whose NLE step 820 uses four sub-processes: embedding 822; denoising 824; state preparation based on estimated error 825; and VQC 823. The LE estimate 821 is refined by a denoising function 824 in NLE step, which employs a VQC-based scaling operation. In this embodiment, the use of QPUs for VQC enables efficient NLE step for compressed sensing, in particular for the case when unknown correlation exists in the grant-free device communications. In another embodiment, the turbo decoding is realized with the hybrid use of CPUs and QPUs besides the compressed sensing. For this case, VQC-based decoding is realized by QPUs in the loop of LE step 811 and NLE step 812. The turbo decoding 813 includes QAOA-based decoding 814 and log-likelihood ratio (LLR) computation 815.

Figure 8D:
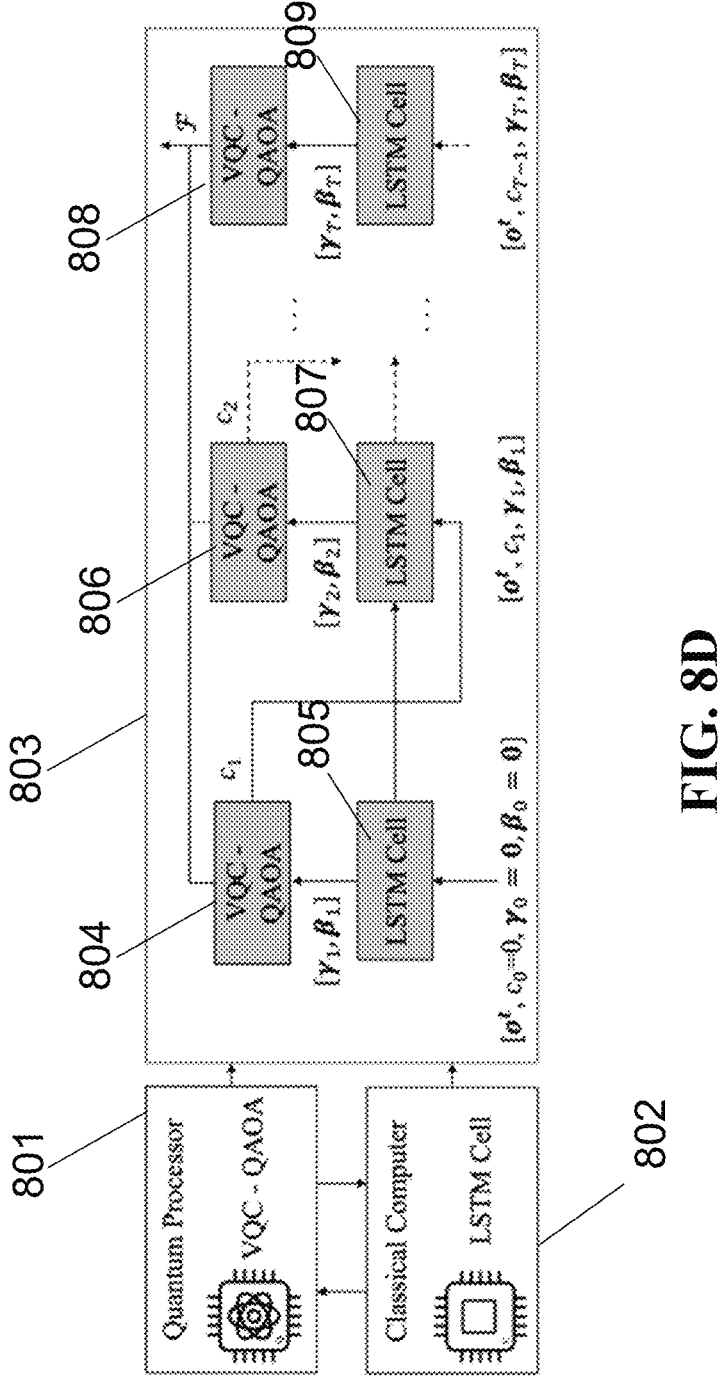

Instead of using traditional stochastic gradient descent method to gradually tune the trainable parameters in VQC, which requires a large number of information exchanges between a classical computer and a quantum processor, some embodiments use a learning-to-learn (L2L) scheme based on reinforcement learning framework to find the variational parameters in a small number of information exchanges. The L2L method can accelerate the optimization steps while finding the trainable/variational parameters in the VQC. For example, for the scenario of learning the parameters to be used in QAOA, the input of a classical neural network is the initialization and the expectation over the QAOA's cost Hamiltonian. FIG. 8D shows an exemplar signal processing which exploits CPUs 802 for long short-term memory (LSTM) modules and QPUs 801 for QAOA decoding. The QAOA decoding is used to identify the communicating devices in an iterative approach, where multiple QAOA operations 804, 806, 808 are taken place to refine the device identification. The QAOA decoding takes multiple variational parameters betas and gammas, which are optimized by multiple LSTM cells 805, 807, 809 for each QAOA decoding iterations. After the hybrid use of CPUs and QPUs over iteration 803, the final estimate of the device identities is provided. This L2L-based method enables alternative optimization of variational parameters, without requiring the gradient backpropagation.

System Implementation

Figure 9A:
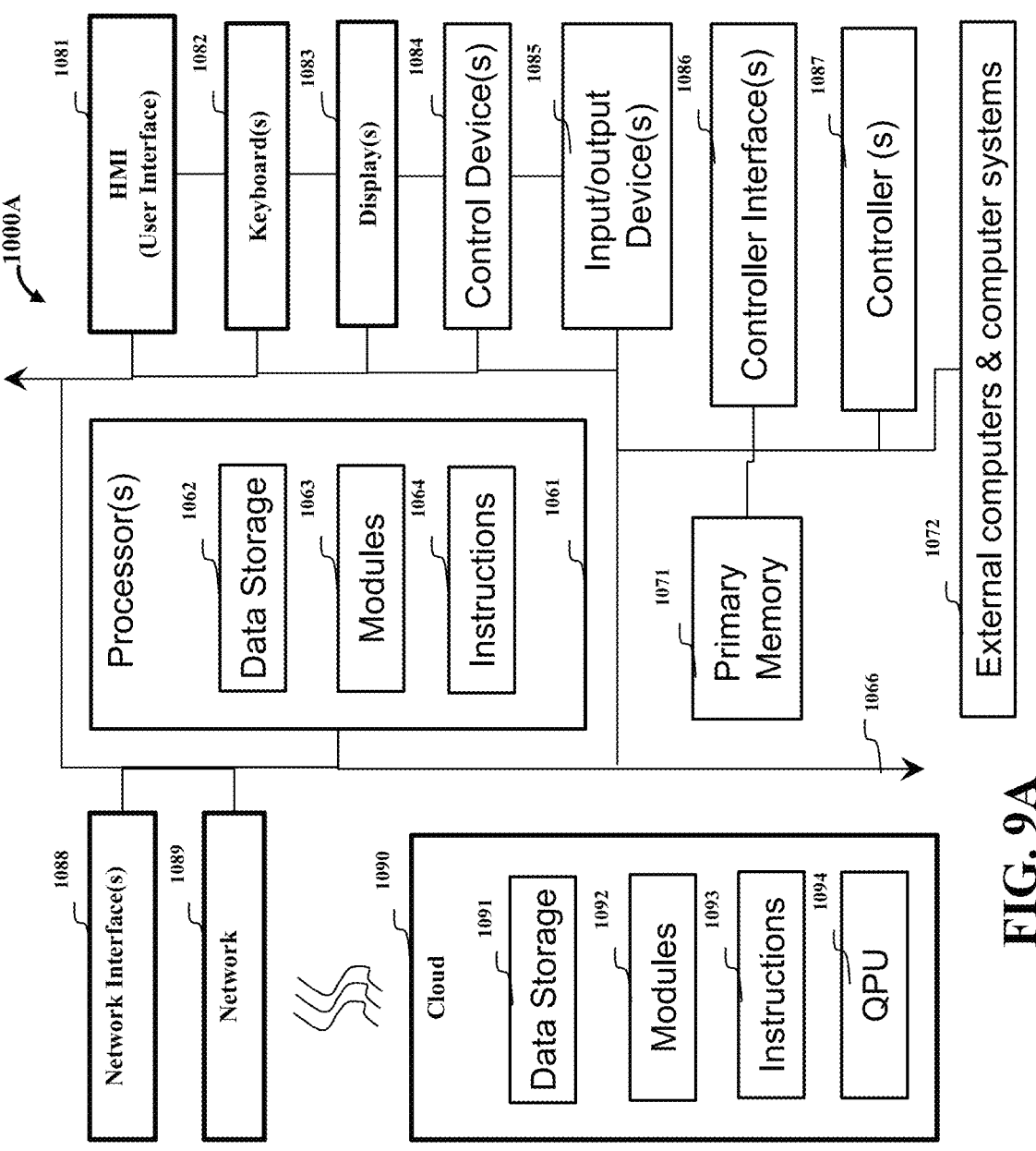
FIGS. 9A and 9B show exemplar systems of integrated communications and sensing empowered by networked hybrid quantum-classical computing according to some embodiments.

FIG. 9A is a diagram of some components of a processing system that can be used with some operations for one or all embodiments of the present disclosure, according to some embodiments of the present disclosure. The processing system 1000A is inter-connected via a bus system 1066 that interconnects components of the system. The system 1000A can include one or more central processing units ("processors") 1061. The processor 1061 can be a server computer, a third party computer, a personal computer (PC), a client computer, a user device, a tablet PC, a laptop computer, a cellular telephone, a smart phone, a web device, a network router, switch or bridge, a console, or any machine configured for executing instructions according actions taken by the computing system. Further, the processing system 1000A can include data storage 1062, stored modules 1063 and sets of instructions 1064.

The processing system 1000A can include a primary memory 1071, that can include other types of memory (not shown) such as databases, non-volatile memory machine-readable medium, servers, etc., depending upon a user's requirements and operational components. The primary memory along with the above noted components can store instructions, applications, programs, modules, computer programs, all of which can be carried out by one or more processors of the system.

Still referring to FIG. 9A, the system 1000A can include a Human-Machine Interface (HMI) 1081 that is a user interface or dashboard that connects a person to a machine, system, or device. Other terms for HMI can be Man-Machine Interface (MMI), Operator Interface Terminal (OIT), Local Operator Interface (LOI), or Operator Terminal (OT). HMI and Graphical User Interface (GUI) are similar, such that GUIs are often leveraged within HMIs for visualization capabilities. The HMI can be used to visually display data, track production time, trends, and tags, oversee KPIs, monitor machine inputs and outputs, depending upon a user's system and operational requirements. Some components can be directed connected to the HMI or to a bus system 1066 can be keyboards 1082, displays 1083, control devices 1084 and input/output devices 1085, and like other components associated with the above noted terms that are known to operate in particular industries.

Other components of the system 1000A can include controller interfaces 1086, controllers 1087, external computers and computer systems 1072, network interfaces 1088 and at least one network 1089. The network interfaces 1088 can include a network adapter that assists with the processing system 1000A to manage data in the network 1089 with an entity that can be, but not required, external to the processing system 1000A (i.e. network appliances, etc.), as typically configured through any known and/or convenient communications protocol supported by the processing system 1000A and the external entity. The network adapter 1089 can include network adaptor cards, a wireless network interface card, a router, an access point, a wireless router, a switch, multilayer switches, protocol converters, gateways, bridges, bridge routers, hubs, digital media receivers, and/or repeaters. The network adapter 1089 can include a firewalls which can govern and/or manage permission to access data in computer networks, and track levels of trust between different machines and/or applications. The firewalls can be any number of modules having any combination of hardware and/or software components able to enforce a predetermined set of access rights between a particular set of machines and applications, machines and machines, and/or applications and applications. For example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Still referring to FIG. 9A, the network 1089 can include a communication system that communicates wirelessly or can be wired to other components such as appliances, machines, etc., that can be used with the embodiments of the present disclosure. For example, the network 1089 can communication with a cloud 1090, the cloud 1090 can include data storage 1091, modules 1092, sets of instructions 1093, and quantum processing units (QPUs) 1094 as well as other components and aspects that is known in the cloud understandings within the cloud industries. Noted, is that the bus system 1066 can be separate buses, specific connections from one component or sub-system to another, or both connected by bridges, adapters, or controllers. The bus 1066, can be configured for relaying data packets between components of a network appliance (i.e. network ports, other ports, etc.).

Figure 9B:
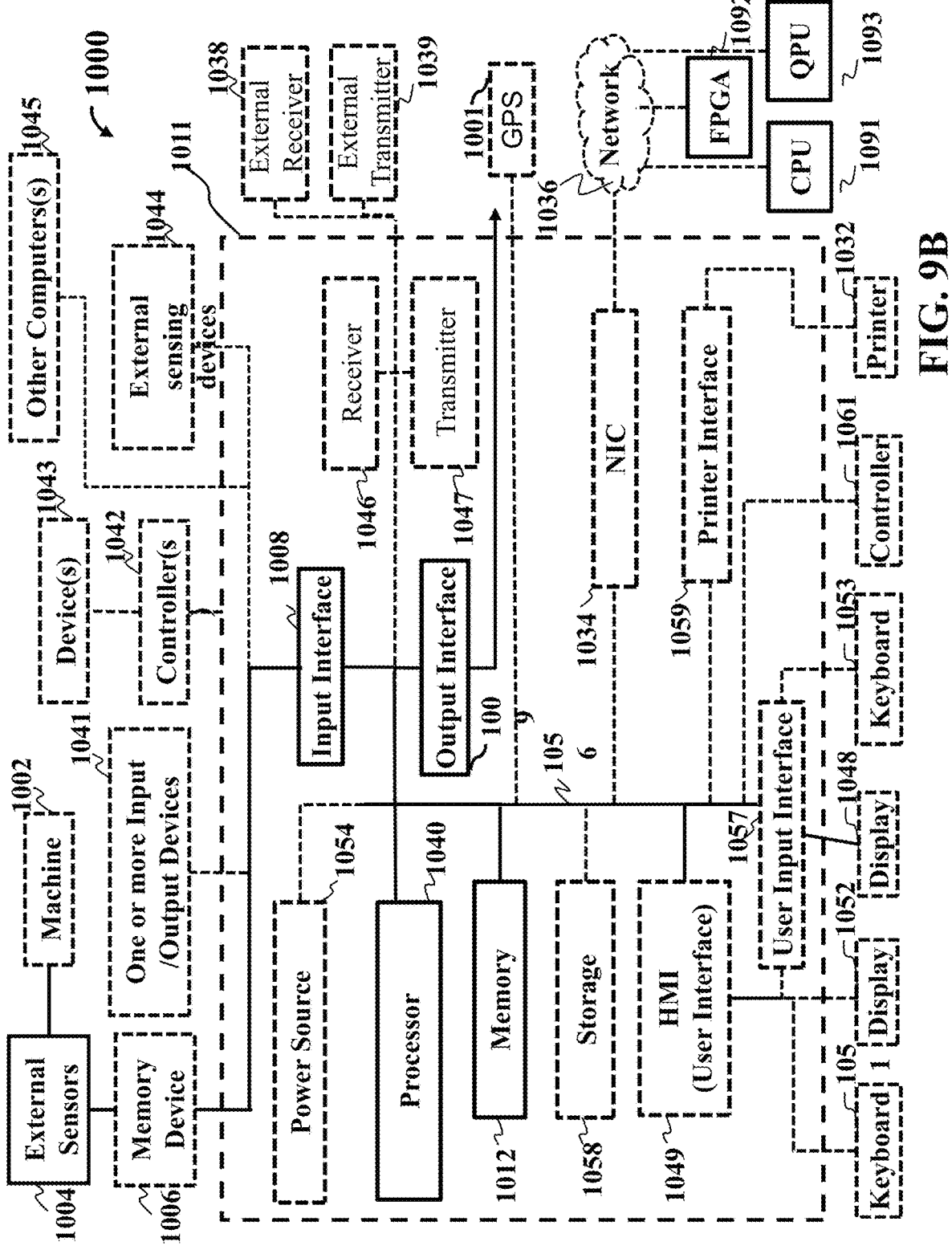

FIG. 9B is a block diagram of illustrating some components of a computer that can be used with or in combination with some or all components of FIG. 9A, according to some embodiments of the present disclosure. The components 1000B can include a computer 1011 having a processor 1040, computer readable memory 1012, storage 1058 and user interface 1049 with display 1052 and keyboard 1051, which are connected through bus 1056. For example, the user interface 1064 in communication with the processor 1040 and the computer readable memory 1012 acquires and stores the data in the computer readable memory 1012 upon receiving an input from a surface, keyboard 1053, of the user interface 1057 by a user.

The computer 1011 can include a power source 1054; depending upon the application the power source 1054 can be optionally located outside of the computer 1011. Linked through bus 1056 can be a user input interface 1057 adapted to connect to a display device 1048, wherein the display device 1048 can include a computer monitor, camera, television, projector, or mobile device, among others. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect through the bus 1056 to a network 1036, wherein data or other data, among other things, can be rendered on a third party display device, third party imaging device, and/or third party printing device outside of the computer 1011. The computer/processor 1011 can include a GPS 1001 connected to bus 1056. Through the network 1036, at least one classical computing processor such as central processing unit (CPU) 1091 and field-programmable gate-array (FPGA) 1092, and at least one quantum computing processor (QPU) 1093 are used to execute signal processing methods for data communications and sensing.

Still referring to FIG. 9B, the data or other data, among other things, can be transmitted over a communication channel of the network 1036, and/or stored within the storage system 1058 for storage and/or further processing. Further, the time series data or other data can be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. The computer 1011 can be connected via an input interface 1008 to external sensing devices 1044 and external input/output devices 1041. The input interface 1008 can be connected to one or more input/output devices 1041, external memory 1006, external sensors 1004, which can be connected to a machine-like device 1002. A controller(s) 1042 can be connected to device(s) 1043. Further, other computer(s) 1045 can be connected to the bus 1056). For example, the external sensing devices 1044 can include sensors gathering data before-during-after of the collected time-series data of the machine. The computer 1011 can be connected to other external computers 1042. An output interface 1009 can be used to output the processed data from the processor 1040. It is noted that a user interface 1049 in communication with the processor 1040 and the non-transitory computer readable storage medium 1012, acquires and stores the region data in the non-transitory computer readable storage medium 1012 upon receiving an input from a surface 1052 of the user interface 1049 by a user. Further, a controller 1061 can be connected to the bus 1056, to control devices associated with the embodiments of the systems and methods of the present disclosure.

Additional Features

An aspect is that at least one communication link is configured with an interface, gateway, switching hub, router, access point or its variant, and that at least one communication link is based on electric wired communications, fiber-optic communications, radio wireless communications, free-space light communications, visible light communications, power-line communications, magnetic coupling communications, acoustic communications, millimeter wave/tera-hertz communications, and so on.

An aspect is that at least one classical computing processor is based on a central processing unit (CPU), graphics processing unit (GPU), tensor processing unit (TPU), field programmable gate array (FPGA), micro processor (uP), digital signal processor (DSP), application specific integrated circuit (ASIC), complex programmable logic devices (CPLD), and so on.

An aspect is that at least one quantum computing processor is based on a superconducting quantum physics, trapped ion quantum physics, photonic quantum physics, neutral atoms, nuclear magnetic resonance, quantum annealing, Boson sampling, quantum physics emulator, or its variant.

An aspect is that the variational quantum circuit further comprises a quantum state preparation module, a quantum state evolution module, and a quantum state measurement module. The quantum state preparation module is based on an angle embedding, amplitude embedding, basis embedding, displacement embedding, quantum approximate-optimization algorithm (QAOA) embedding, squeezing embedding, instantaneous quantum polynomial (IQP) time embedding, Mottonnen state preparation ansatz, or its variant. The quantum state evolution module is based on a simplified two-design ansatz, QAOA ansatz, tree-tensor network (TTN) ansatz, matrix product state (MPS) ansatz, multi-scale entanglement renormalization ansatz (MERA), strongly entangling layer ansatz, basic entangler ansatz, random layer ansatz, continuous variable (CV) neural network layers, or such variant. The quantum state measurement module is based on an expectation value, sampling value, variance value, probability, quantum state, quantum density matrix of a computational basis or such variant.

Another aspect is that the hybrid classical-quantum computing method is based on an adaptive filtering algorithm, gradient descent algorithm, feature extraction algorithm, classification algorithm, regression algorithm, prediction algorithm, compressed sensing algorithm, estimation algorithm, inference algorithm, deep neural network, machine learning, denoising algorithm, encoding, decoding, modulation, demodulation, equalization, or such variant for signal processing of data communications and sensing.

An aspect is that the trainable parameters for classical computing processors are adjusted based on a stochastic gradient descent (SGD), resilient backpropagation, root-mean-square (RMS) propagation, Broyden-Fletcher-Goldfarb-Shanno (BFGS) algorithm, adaptive momentum (Adam) optimization, metaheuristic optimization, simulated annealing (SA), genetic algorithm (GA), simplex method such as Nelder-Mead, adaptive subgradient, adaptive delta, evolutionary algorithm, evolutionary strategy (ES) such as covariance matrix adaptation (CMA), swarm intelligence such as ant colony optimization (ACO), particle swarm optimization (PSO), and so on, deep learning, reinforcement learning (RL) such as policy gradient, Bayesian optimization (BO) such as Gaussian process (GP), and such variant.

An aspect is that the variational parameters for quantum processing units are adjusted based on an SGD, parameter-shift rule, adjoint method, finite difference, policy gradient, resilient backpropagation, RMS propagation, BFGS algorithm, Adam, simplex method, adaptive subgradient, adaptive delta, metaheuristic optimization, SA, GA, evolutionary algorithm, CMA-ES, differential evolution (DE), swarm intelligence, deep learning, RL, BO, or its variant.

An aspect is that the data exchanging is based on encoding, decoding, modulating, demodulating, compressing, decompressing, equalizing, transmitting, receiving, relaying, filtering, measuring, synchronizing, queueing, scheduling, delaying, multiplexing, demultiplexing, sampling, resampling, authenticating, scrambling, interleaving, beamforming, shaping, and so on.

An aspect is that the hybrid classical-quantum computing method is performed based on an adaptive filtering algorithm, gradient descent algorithm, feature extraction algorithm, classification algorithm, regression algorithm, prediction algorithm, compressed sensing algorithm, estimation algorithm, inference algorithm, deep neural network, machine learning, denoising algorithm, encoding, decoding, modulation, demodulation, equalization, or its variant.

Another aspect is that sub-instructions are distributed across networked CPUs and QPUs to determines a resource allocation and a type of operations. At least one controller including a processor and a memory storing the distributed sub-instructions constructs the computing graph, and the computing graph can be backpropagated to calculate a loss gradient over multiple CPUs and QPUs so that the trainable parameters and variational parameters are adjusted. At classical computing processors, a deep neural network is constructed by the set of trainable parameters. At quantum computing processors, a variational quantum circuit is specified by the set of variational parameters.

An aspect is that training data and testing data are based on a time stamp, an amount of temperature, an amount of a volume of sound, an amount of light, image data, video data, an amount of magnetic flux, an amount of output from an accelerometer, an amount of pressure, an amount of vibration, an amount of infrared red light, an amount of humidity, an amount of electrical power, an amount of particle concentration, an amount of odors, an amount of radiation, other digital data, and other analog data. The data are associate with an environmental state to estimate, such as types of behavior, states, poses, and locations of an object, e.g., for a stationary thing, moving thing, living thing, or non-living thing such as ambient furniture, ambient materials, ambient buildings, ambient plants, ambient pets, ambient computers, ambient robots, ambient users or communication devices.

An aspect includes the wireless channel attribute data is based on one or a combination of, an amount of a signal strength, an amount of a noise strength, an amount of an interference strength, an amount of a signal-to-noise ratio (SNR), an amount of a signal-to-noise-and-interference ratio (SINR), a set of channel state information, an amount of time of arrival, an angle of arrival (AoA), an angle of departure (AoD), a power delay profile (PDP), a power spectral density (PSD), a delay Doppler spectrum, an angle power spectrum, a beam power profile or other data.

An aspect is that the heterogenous data is obtained by one or a combination of, a vision/imaging sensor, a temperature sensor, a radiation sensor, a proximity sensor, a pressure sensor, a position sensor, a photoelectric sensor, a particle sensor, a motion sensor, a metal sensor, a level sensor, a leak sensor, a humidity sensor, a gas/chemical sensor, a force sensor, a flow sensor, a flaw sensor, a flame sensor, an electrical sensor, a contact sensor, a non-contact sensor or other sensor devices.

Another aspect is the estimated environmental state is determined for a time period, and includes one or a combination of, types of behavior of at least one object, states of at least one object, poses of at least one object or locations of at least one object. Wherein the at least one object is one of stationary, moving, a living thing, a non-living thing such as one or a combination of ambient furniture, ambient materials, ambient buildings, ambient plants, ambient pets, ambient computers, ambient robots, ambient users or the radio devices.

Another aspect is the environmental state includes one or a combination of: an activity of at least one living thing; at least one pose of an object or a living thing; an amount of objects or living things occupancy; an amount of objects or living things within an area of the environment; an amount of in-door traffic; a location of an object or a living thing; a location of an outdoor object or an outdoor living thing within a range of the radio devices; a robot or a non-living thing that is stationary or moving; a set of instructions associated with indoor navigation; or a set of instructions associated with indoor parking assistance.

Still another aspect is the parameterized model is based on a trained deep neural network, such that the deep neural network is trained either online via accessing a communication network. Or offline by accessing the stored measurement data to obtain at least one type of measurement from the first radio band and at least one type of measurement from the second radio band. Fuse the at least two types of measurements from the first and the second radio bands to generate a set of fused measurements. Input the set of fused measurements into the deep neural network, to generate an estimated environmental state in the environment. Compute a loss value based on a difference between the generated estimated environmental state and a stored estimated environmental state accessed from the stored measurement data. Update a set of trainable parameters of the deep neural network by a set of rules for training, wherein the set of rules for training is based on a gradient method. Wherein the deep neural network includes one or a combination of a first network block that encodes the set of fused measurements into an encoded vector depending if the two types of measurements to be fused are different types of measurement formats, such as asynchronous and uncoordinated measurement formats that are uniformly aligned. A second network block converts the encoded vector into a feature vector such that the feature vector is insensitive to the different types of measurement formats. A third network block generates the estimated environmental state based on the feature vector and the set of fused measurements. A fourth network block reconstructs the set of fused measurements from the feature vector. A fifth network block regularizes the feature vector for disentanglement in an adversarial fashion.

An aspect is the at least one type of measurement from the first radio band is mid-grained beam signal to noise ratio (SNR) measurements at a mmWave band of 60 GHz, and the at least one type of measurement from the second radio band is fine-grained channel state information (CSI) measurements at sub-6 GHz from multiple spatial streams, such that the fusion includes fusing the fine-grained CSI measurements at sub-6 GHz from multiple spatial streams with the fine-grained CSI measurements at sub-6 GHz from multiple spatial streams. Wherein the fine-grained CSI measurements include complex-valued amplitudes at orthogonal frequency-division multiplexing (OFDM) subcarrier tones, such that the fine-grained CSI measurements are equivalent to a power delay profile (PDP) in a time-domain and reflects a power distribution along propagation paths, and wherein the mid-grained beam SNRs provide spatial-domain channel measurements over multiple beamforming directions or beam spaces.

Another aspect is the coverage of the environmental states is automatic based upon generating the estimated environmental state. The computing processor via the executable programs is configured to access each module of the modules via the data storage, such that each module includes one or more predetermined rules. Iteratively, input the estimated environmental state into each model, to generate an output of either an alert action, or no action, if the alert action is generated by the module, implies at least one predetermined rule is violated, and the computing processor converts the alert action to an alert signal, sends the alert signal via the transceiver, to the communication network. Wherein the alert signal is received and inputted into an alert processing module associated with the system, to generate an output including one or more corrective actions with a set of instructions based on the estimated environmental state which is sent to a work team to complete. Wherein at least module is a proximity module that includes the steps of input the estimated environmental state into the proximity module to generate either a proximity alert action, or no proximity alert action, if the proximity alert (PA) action is generated, implies at least one predetermined proximity rule is violated such as an moving object in the environment has entered into a predetermine no object allowed designated area within the environment, and the computing processor converts the PA action to a PA signal, sends the PA signal via the transceiver, to the communication network. Wherein the PA signal is received and inputted into the alert processing module associated with the system, to generate an output including one or more corrective proximity actions with a set of instructions based on the estimated environmental state which is sent to a work team to complete, such that the one or more corrective proximity actions includes redirecting the moving object out of the predetermine no object allowed designated area.

Still another aspect is each estimated environmental state for each time period over multiple time periods determines a position of at least one object or living thing within the environment, and each estimated environmental state is displayed on a display device to provide a visual tracking indication of the determined position of the at least one object or the living thing for that time period.

An aspect is an executable program includes instructions to coordinate the at least one radio device using the multiple antenna elements over the first communication channel at the first radio band with the other radio devices included instructions using their respective multiple antenna elements over the first communication channel at the first radio band, which when executed by the computing processor, cause the at least one radio device to coordinate time synchronization with the other radio devices.

Another aspect is the stored data includes values indicative of signal to noise ratio (SNR) measurements of a set of beams emitted at different beam angles by the phased antenna array and measured at a set of locations, that provide for a mapping between different combinations of SNR values of the set of beams and the set of locations, such that a location from the set of locations is for a period of time mapped to a unique combination of the SNR values of the set of beams, and further provides information associated with types of behavior of the device at the location for that period of time, poses of the device at the location for that period of time, locations of physical objects in the environment for that period of time, and types of behavior of ambient users in the environment for that period of time.

Still an aspect is the stored data include values indicative of link attributes including one of beam received signal strength indicator (RSSI) measurements, beam channel state information (CSI) measurements, beam patterns or beam sequencing, wherein each link attribute includes measurements of a set of beams emitted at different beam angles by the phased array of antennas and measured at a set of locations in the environment, wherein the stored values provide a mapping between different combinations of at least one link attribute values of the set of beams and the set of locations, such that a location from the set of locations is mapped to a unique combination of the at least one link attribute values of the set of beams. Wherein the link attributes further include one or a combination of RSSI measurements or CSI measurements.

An aspect includes using a communication system having beamforming transmission in a millimeter wave spectrum in an environment, that includes a phased antenna array configured to perform beamforming to establish millimeter wave channel links with devices at different locations in the environment. The method including performing a beam training with a target device located in an environment to estimate SNR measurement values for different beams transmitted over the different beam angles using control circuitry connected with the antennas. The control circuitry is configured for selecting, in response to the beam training, at least one dominant angle for a beamforming communication with the target device. Accessing a memory connected to the phased antenna array, the memory having stored data. The stored data include values indicative of SNR measurements of a set of beams emitted at different beam angles by the phased antenna array and measured at a set of locations in the environment. Wherein the stored values provide a mapping between different combinations of SNR values of the set of beams and the set of locations. Such that a location from the set of locations is mapped to a unique combination of the SNR values of the set of beams. Estimating from the mapping stored in the memory, a location of the target device corresponding to the SNR values for different beams estimated during the beam training. Transmitting the estimated location of the target device using the phased antenna array via a beamforming transmission over the at least one dominant angle.

Wherein another aspect is the stored data from data storage includes fingerprinting data, the fingerprinting data includes each location from the set of locations mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time.

Some aspects include a communication system using beamforming transmission in a millimeter wave spectrum in an environment, that includes a phased antenna array configured to perform beamforming to establish millimeter wave channel links with devices at different locations in the environment. The communication system including a memory connected to the phased antenna array, having stored data. The stored data include values indicative of signal to noise ratio (SNR) measurements of a set of beams emitted at different beam angles by the phased antenna array and measured at a set of locations, that provide for a mapping between different combinations of SNR values of the set of beams and the set of locations. Such that a location from the set of locations is mapped to a unique combination of the SNR values of the set of beams. Control circuitry communicatively connected with the phased antenna array and the memory, configured to perform a beam training with a target device located in the environment to estimate SNR values for different beams transmitted over the different beam angles. Select, in response to the beam training, at least one dominant angle for a beamforming communication with the target device. Estimate from the mapping stored in the memory, a location of the target device corresponding to the SNR values for different beams estimated during the beam training. Transmit the estimated location of the target device using the phased antenna array via a beamforming transmission over the at least one dominant angle.

Wherein, other aspect can include the stored data include each location from the set of locations that is mapped to the unique combination of the SNR values of the set of beams for a period of time, such that the unique combination of the SNR values of the set of beams at that period of time further provides information associated with types of behavior of the device at the location for that period of time, poses of the device at the location for that period of time, locations of physical objects in the environment for that period of time, and types of behavior of ambient users in the environment for that period of time.

The above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers. Such processors can be implemented as integrated circuits, with one or more processors in an integrated circuit component. Though, a processor can be implemented using circuitry in any suitable format.

Also, the embodiments of the invention can be embodied as a method, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

What is claimed is:

1. A system for integrated computing, sensing, and communications comprises:
at least one communication link;
at least one classical computing processor configured with a set of trainable parameters;
at least one quantum computing processor configured with a set of variational parameters;
at least one controller to generate a computing graph over a network connecting the at least classical computing processor and the at least quantum computing processor across the at least one communication link, wherein the controller updates the computing graph during operation by reassigning at least one node from the quantum computing processor to the classical computing processor or vice versa in response to a change in at least one runtime metric comprising processor load, quantum processor queue time, network latency, or sensing task requirement, wherein the controller generates the computing graph by distributing a plurality of operations for data communications and sensing among the at least one quantum computing processor and the at least one classical computing processor based on power consumption of the at least one classical computing processor and the at least one quantum computing processor, latency to complete the plurality of operations, and accuracy of the plurality of operations;
at least one memory bank coupled with the at least one classical computing processor and the at least one quantum computing processor through the at least one communication link, wherein the at least one memory bank stores instructions implementing a set of computing methods based on networked hybrid classical-quantum processing for data communications, machine learning, and environment sensing according to the computing graph, wherein the instructions, when executed by the at least one classical computing processor and the at least one quantum computing processor, carry out at steps of;
causing the at least one classical processor to exchange data through the at least one communication link, to adjust the set of trainable parameters and the set of variational parameters, and to update a set of data in the at least one memory bank according to the set of computing methods; and
causing the at least one quantum processor to measure a quantum state given the set of variational parameters and the set of data in the at least one memory bank according to the set of computing methods.

2. The system of claim 1, wherein the at least one communication link is configured with an interface, gateway, switching hub, router, access point or a variant thereof, wherein the at least one communication link is based on electric wired communications, fiber-optic communications, radio wireless communications, free-space light communications, magnetic coupling communications, acoustic communications, millimeter wave/tera-hertz communications, or a variant thereof.

3. The system of claim 1, wherein the at least one classical computing processor is based on a central processing unit, graphics processing unit, tensor processing unit, field programmable gate array, micro processor, digital signal processor, application specific integrated circuit, complex programmable logic devices, or a variant thereof.

4. The system of claim 1, wherein the at least one quantum computing processor is based on a superconducting quantum devices, trapped ion quantum devices, photonic quantum devices, neutral atoms devices, nuclear magnetic resonance devices, quantum annealing devices, Boson sampling devices, quantum emulator devices, or a variant thereof.

5. The system of claim 1, wherein the quantum computing processor further comprises a quantum state preparation module, a quantum state evolution module, and a quantum state measurement module.

6. The system of claim 5, wherein the quantum state preparation module is based on an angle embedding, amplitude embedding, basis embedding, displacement embedding, quantum approximate-optimization algorithm embedding, squeezing embedding, instantaneous quantum polynomial time embedding, Mottonen state preparation ansatz, or a variant thereof.

7. The system of claim 5, wherein the quantum state evolution module is based on a simplified two-design ansatz, quantum approximate-optimization algorithm ansatz, tree-tensor network ansatz, matrix product state ansatz, multi-scale entanglement renormalization ansatz, strongly entangling layer ansatz, basic entangler ansatz, random layer ansatz, continuous variable neural network layers, or a variant thereof.

8. The system of claim 5, wherein the quantum state measurement module is based on an expectation value, sampling value, variance value, probability, quantum state, von Neumann entropy, mutual information, classical shadow protocol, quantum density matrix of a computational basis or a variant thereof.

9. The system of claim 1, wherein the set of computing methods is based on an adaptive filtering algorithm, gradient descent algorithm, feature extraction algorithm, classification algorithm, regression algorithm, prediction algorithm, compressed sensing algorithm, estimation algorithm, inference algorithm, deep neural network, machine learning, denoising algorithm, encoding, decoding, modulation, demodulation, equalization, or a variant thereof.

10. The system of claim 1, wherein the set of data is associate with an environmental state to estimate, wherein the environmental state comprises one or a combination of: types of behavior, states, poses, motions and locations of at least one object, wherein the at least one object is a stationary thing, moving thing, living thing, or non-living thing such as one or a combination of ambient furniture, ambient materials, ambient buildings, ambient plants, ambient pets, ambient computers, ambient robots, ambient users or communication devices.

11. A computer-implemented method for signal processing, communications and sensing, performed by at least one classical computing processor and at least one quantum computing processor, wherein the at least one classical computing processor and the at least one quantum computing processor are coupled through at least one communication link with a memory bank storing instructions implementing a set of computing methods based on networked hybrid classical-quantum processing, wherein the instructions carry out steps of:

exchanging a set of data among the at least one memory bank, the at least one classical computing processor, and the at least one quantum computing processor through the at least one communication link;

distributing a set of sub-instructions towards the at least one classical computing processor and the at least one quantum computing processor;

constructing a set of computing graphs over the at least one classical computing processor and the at least one quantum computing processor so that a gradient is backpropagated over the set of computing graphs, wherein constructing the computing graph comprises distributing a plurality of operations for data communications and sensing among the at least one quantum computing processor and the at least one classical computing processor based on power consumption of the at least one classical computing processor and the at least one quantum computing processor, latency to complete the plurality of operations, and accuracy of the plurality of operations;

adjusting a set of variational parameters for the at least one quantum computing processor according to the set of computing graphs;

adjusting a set of trainable parameters for the at least one classical computing processor according to the set of computing graphs; and modifying the set of data according to the set of sub-instructions, the set of variational parameters, the set of trainable parameters, and the set of computing graphs.

12. The method of claim 11, wherein the adjusting the set of trainable parameters is based on a stochastic gradient descent, resilient backpropagation, root-mean-square propagation, Broyden-Fletcher-Goldfarb-Shanno algorithm, adaptive momentum optimization, metaheuristic optimization, simulated annealing, genetic algorithm, simplex method, adaptive subgradient, adaptive delta, evolutionary algorithm, evolutionary strategy, swarm intelligence, deep learning, reinforcement learning, Bayesian optimization, or a variant thereof.

13. The method of claim 11, wherein the adjusting the set of variational parameters is based on a stochastic gradient descent, parameter-shift rule, adjoint method, finite difference, policy gradient, resilient backpropagation, root-mean-square propagation, Broyden-Fletcher-Goldfarb-Shanno algorithm, adaptive momentum optimization, simplex method, adaptive subgradient, adaptive delta, metaheuristic optimization, simulated annealing, genetic algorithm, evolutionary algorithm, evolutionary strategy, swarm intelligence, deep learning, reinforcement learning, Bayesian optimization, or a variant thereof.

14. The method of claim 11, wherein the exchanging further comprises the steps of encoding, decoding, modulating, demodulating, compressing, decompressing, equalizing, transmitting, receiving, relaying, filtering, measuring, synchronizing, queueing, scheduling, delaying, multiplexing, demultiplexing, sampling, resampling, authenticating, scrambling, interleaving, beamforming, shaping, or a combination thereof.

15. The method of claim 11, wherein the set of computing methods is based on an adaptive filtering algorithm, gradient descent algorithm, feature extraction algorithm, classification algorithm, regression algorithm, prediction algorithm, compressed sensing algorithm, estimation algorithm, inference algorithm, deep neural network, machine learning, denoising algorithm, encoding, decoding, modulation, demodulation, equalization, or a variant thereof.

16. The method of claim 11, wherein the distributing the set of sub-instructions determines a resource allocation and a type of operations for the at least one classical computing processor and the at least one quantum computing processor.

17. The method of claim 11, wherein the modifying the set of data is based on a deep neural network specified by the set of trainable parameters for the at least one classical computing processor.

18. The method of claim 11, wherein the modifying the set of data is based on a variational quantum circuit specified by the set of variational parameters for the at least one quantum processor.

19. The method of claim 11, wherein the set of data is based on one or a combination of: a time stamp, an amount of temperature, an amount of a volume of sound, an amount of light, image data, video data, an amount of magnetic flux, an amount of output from an accelerometer, an amount of pressure, an amount of vibration, an amount of infrared red light, an amount of humidity, an amount of electrical power, an amount of particle concentration, an amount of odors, an amount of radiation, other digital data, and other analog data.

20. The method of claim 11, wherein the set of data is associate with an environmental state to estimate, wherein the environmental state comprises one or a combination of: types of behavior, states, poses, motions, and locations of at least one object, wherein the at least one object is a stationary thing, moving thing, living thing, or non-living thing such as one or a combination of ambient furniture, ambient materials, ambient buildings, ambient plants, ambient pets, ambient computers, ambient robots, ambient users or communication devices.

\* \* \* \* \*